United States Patent
Thompson et al.

(10) Patent No.: US 8,978,549 B2
(45) Date of Patent: Mar. 17, 2015

(54) BALER ATTACHMENT FOR OPTIONALLY CHANGING THE ORIENTATION OF BALES BEING RELEASED FROM A BALER

(71) Applicant: Forage Innovations B.V., PA Maassluis (NL)

(72) Inventors: Kent L. Thompson, Otley, IA (US); Darin L. Dux, Pella, IA (US); Justin D. Olmstead, Runnells, IA (US)

(73) Assignee: Forage Innovations B.V., PA Massluis (NL)

( * ) Notice: Subject to any disclaimer, the term of this patent is extended or adjusted under 35 U.S.C. 154(b) by 78 days.

(21) Appl. No.: 13/628,555

(22) Filed: Sep. 27, 2012

(65) Prior Publication Data
US 2013/0074709 A1 Mar. 28, 2013

Related U.S. Application Data

(60) Provisional application No. 61/540,286, filed on Sep. 28, 2011.

(51) Int. Cl.
*B30B 5/04* (2006.01)
*A01D 90/10* (2006.01)
*A01F 15/08* (2006.01)

(52) U.S. Cl.
CPC .................................. *A01F 15/0883* (2013.01)
USPC .................................... 100/88; 100/7; 56/341

(58) Field of Classification Search
CPC ............ A01F 15/0883; A01F 15/0875; Y10S 414/124
USPC ........ 100/7, 87, 88, 188 R; 56/341; 414/24.5, 414/24.6, 111, 470, 482, 483, 547, 911
See application file for complete search history.

(56) References Cited

U.S. PATENT DOCUMENTS

| | | | |
|---|---|---|---|
| 4,162,135 A | 7/1979 | Seymour | |
| 5,822,967 A * | 10/1998 | Hood et al. | 56/341 |
| 6,033,172 A | 3/2000 | Simon | |
| 6,073,550 A | 6/2000 | Goossen et al. | |
| 6,240,712 B1 * | 6/2001 | Meijer | 56/16.4 R |
| 7,000,533 B2 | 2/2006 | Derscheid et al. | |
| 7,197,979 B2 * | 4/2007 | Derscheid | 100/87 |
| 7,353,753 B2 | 4/2008 | Viaud | |

FOREIGN PATENT DOCUMENTS

| | | |
|---|---|---|
| EP | 1512320 | 3/2005 |
| EP | 1731023 | 12/2006 |
| GB | 2292335 | 2/1996 |

OTHER PUBLICATIONS

Copy—11 pages, of International Search Report from corresponding PCT application.
Copy—7 pages, of Notification Concerning Transmittal of International Preliminary Report on patentability (Chapter 1 of the PCT)—Preliminary Report and Written Opinion of the International Searching Authority—from corresponding PCT application.

* cited by examiner

*Primary Examiner* — Jimmy T Nguyen
(74) *Attorney, Agent, or Firm* — Sturm & Fix LLP

(57) ABSTRACT

A bale turning apparatus for attachment to a baler to generally align the cylindrical of the bales in each row as the bales are released from the baler. Using the disclosed invention, the bales are essentially turned ninety degrees from the orientation of bales from the position that they are typically released from a round baler. By accomplishing this general alignment of the cylindrical axis of each bale in each row, when baling corn stover or other row crops, the bale loading operation can later be done more efficiently by driving down the rows in the same direction as the combine and baler have traveled.

23 Claims, 21 Drawing Sheets

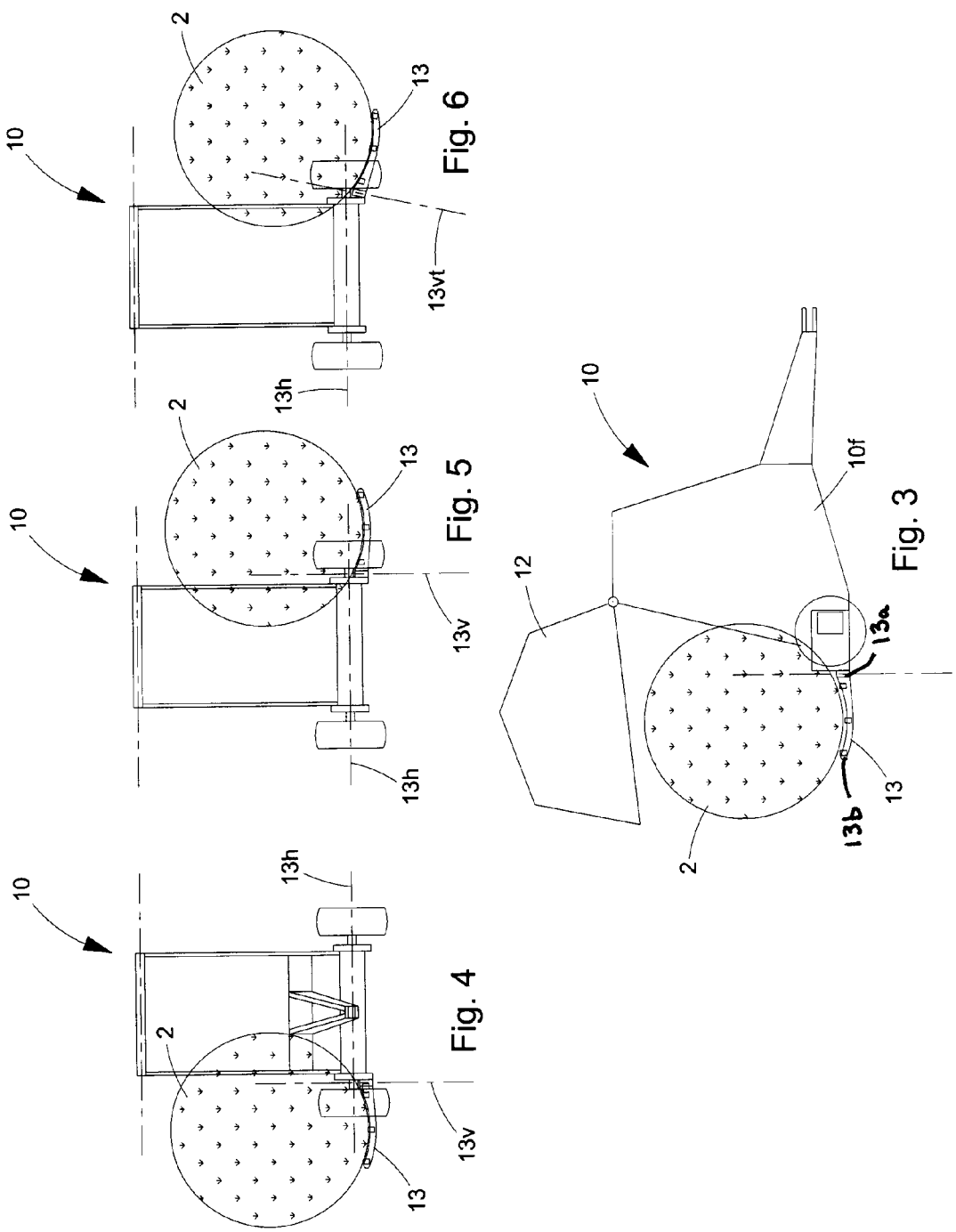

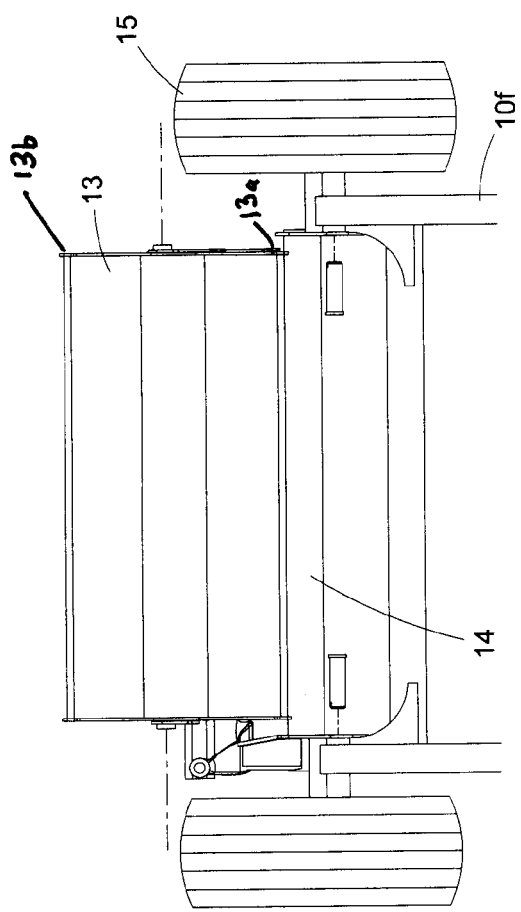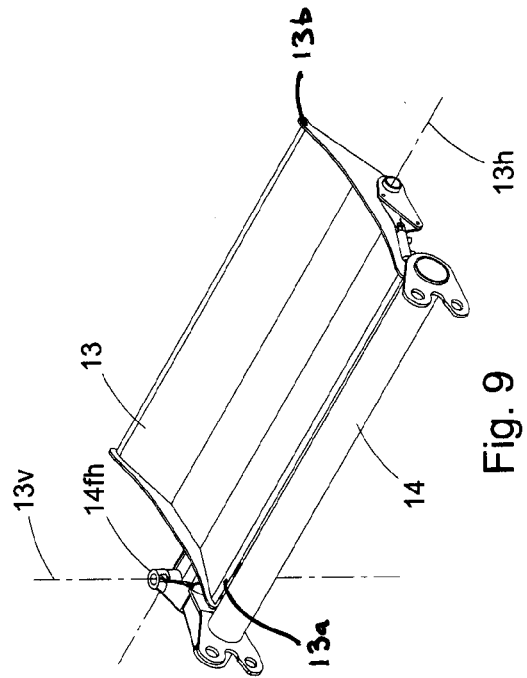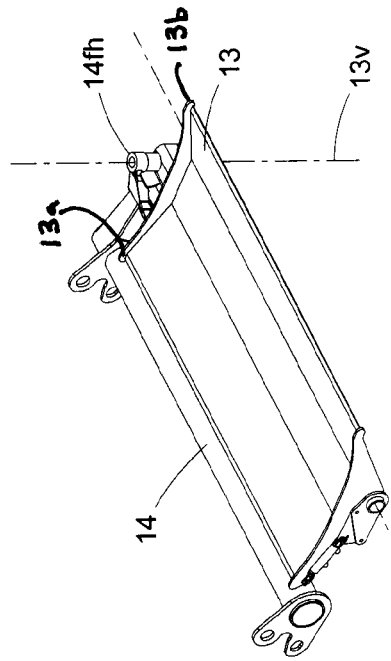

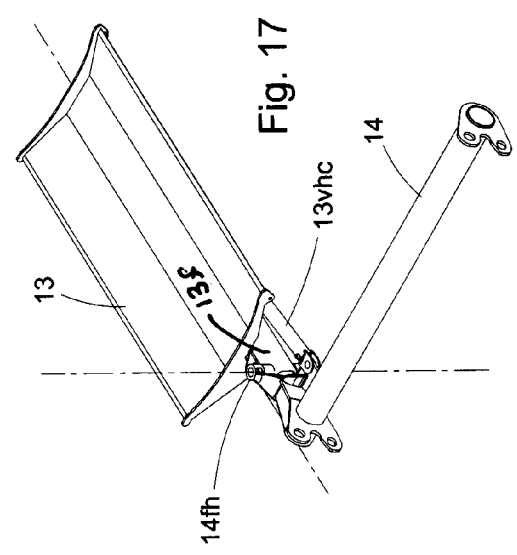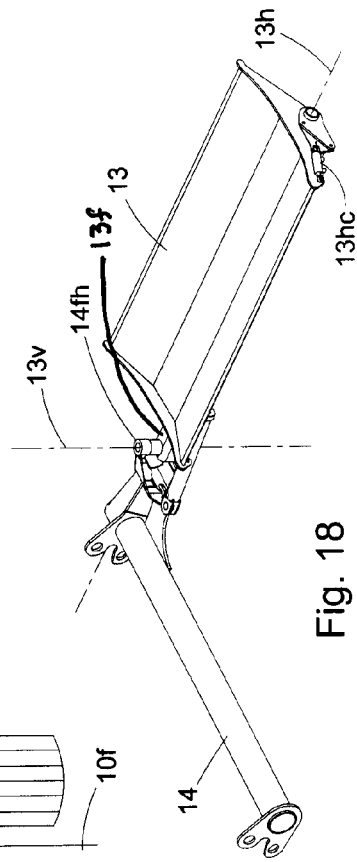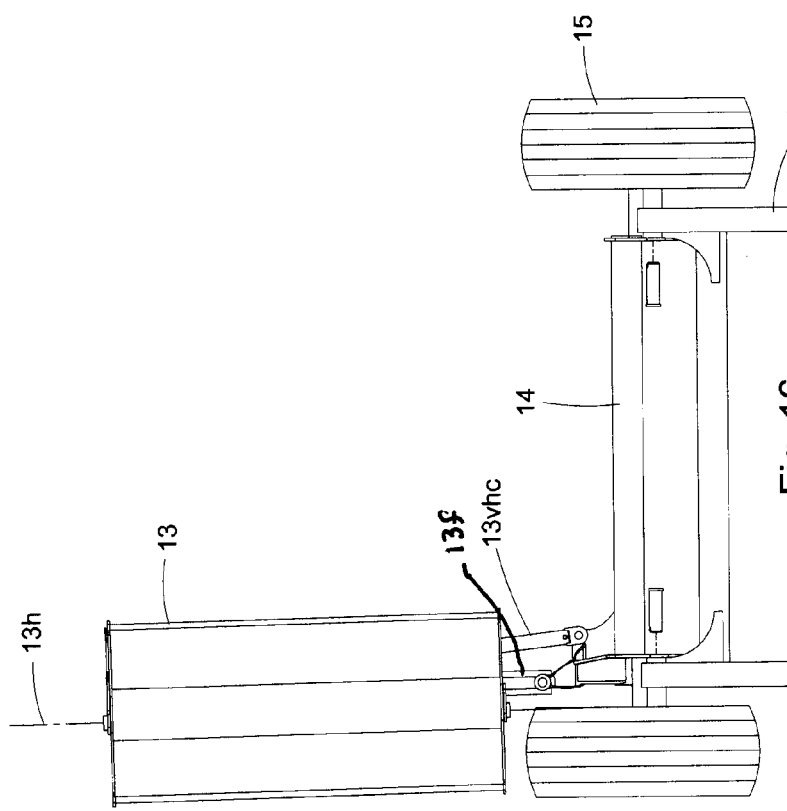

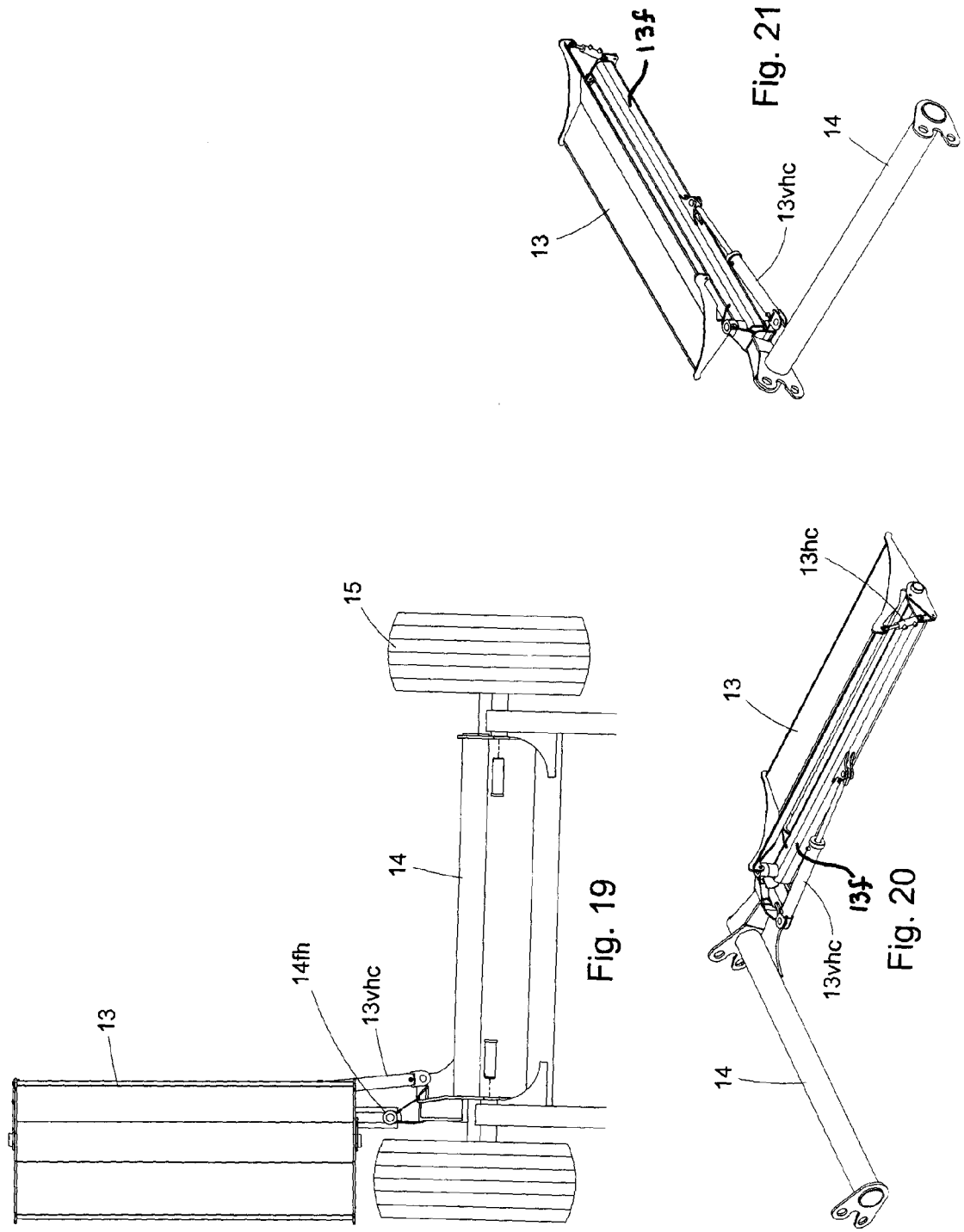

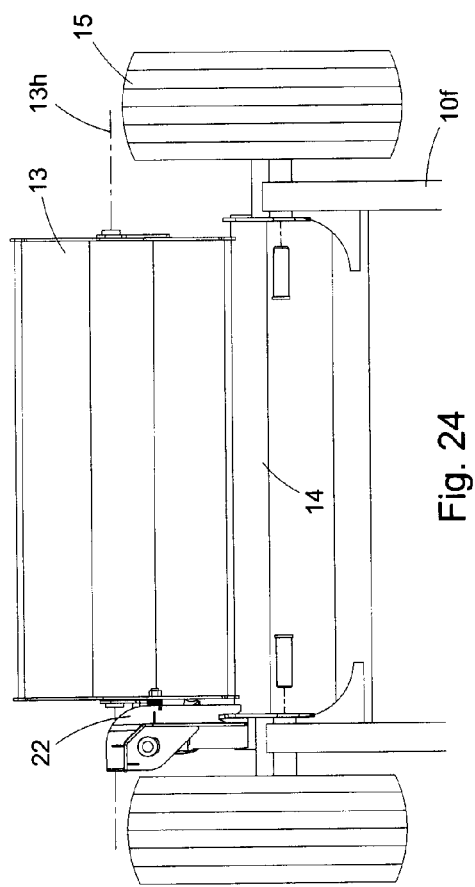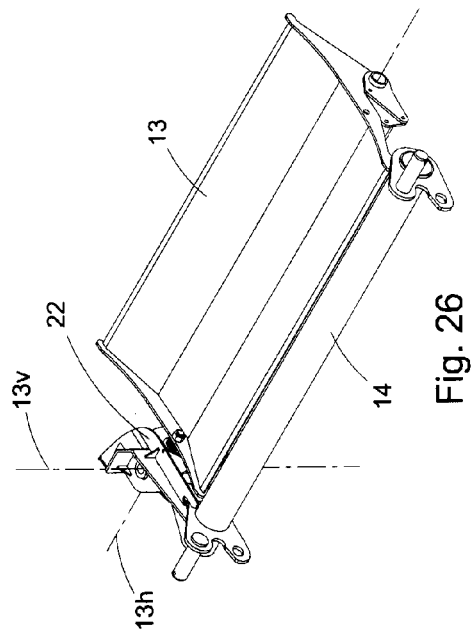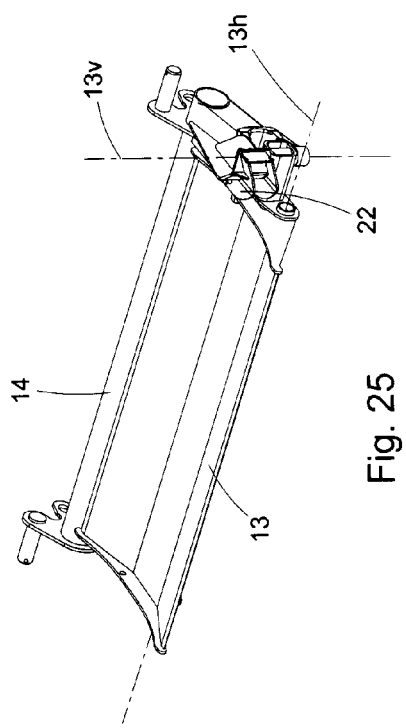

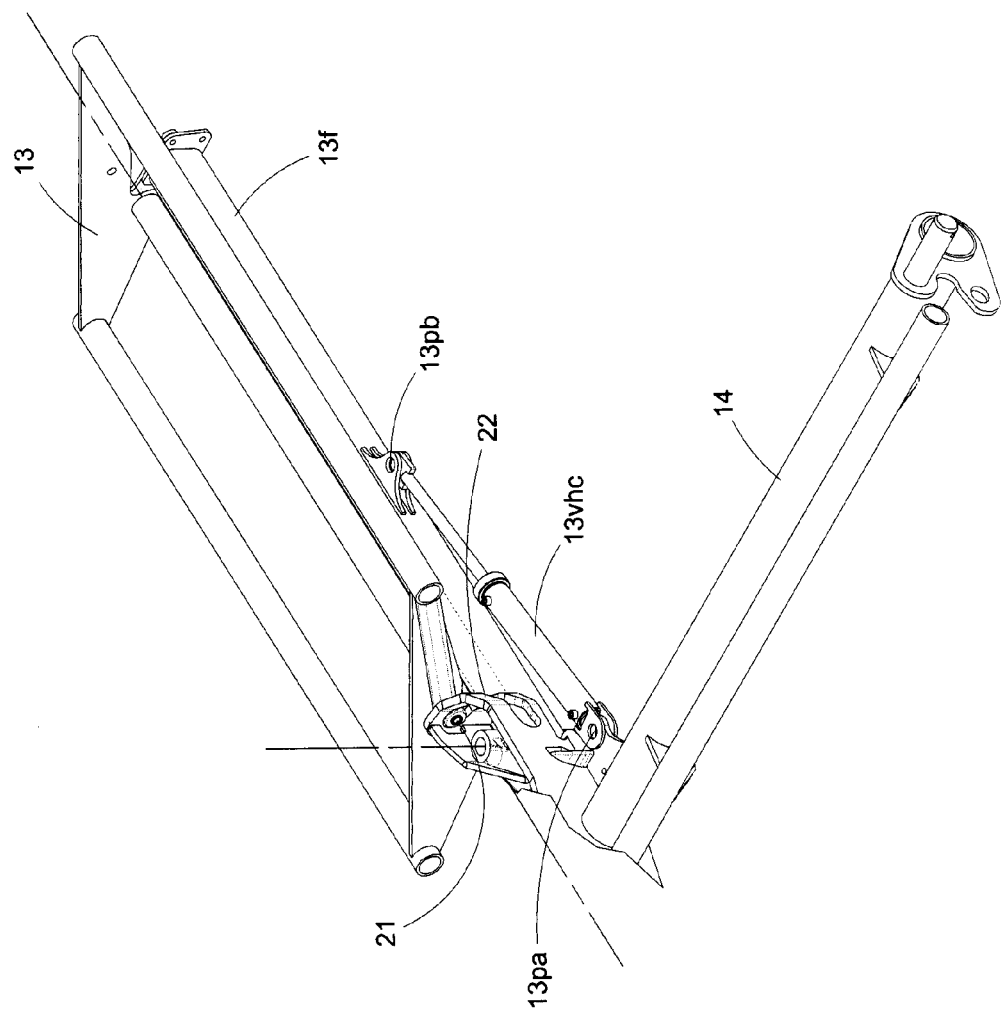

BALER ATTACHMENT FOR OPTIONALLY CHANGING THE ORIENTATION OF BALES BEING RELEASED FROM A BALER

TECHNICAL FIELD

This invention relates generally to balers and more particularly to an attachment for balers for controlling the orientation of bales when such bales are released from the baler onto the ground.

BACKGROUND

As forage material comes into a baler for making round bales, the material turns in the baling chamber around a rotational axis of formation, or the eventual cylindrical axis of the bale, which axis is transverse to the direction of forward travel of the baler as the bale is being formed. So when the bales are released from the rear of the baler, the cylindrical axis of the bale is still transverse to the direction of forward travel of the baler.

Since typically round bales are ejected from the baler with their axis perpendicular to the direction of travel, this means that current standard retrieval machines must also travel perpendicular to the field rows to line up with the bales and weave inefficiently throughout the field to get to each bale. In row crops, this also results in travelling across the field rows which is bumpy and can be uncomfortable for the operator and damaging to the equipment. Some current retrievers attempt to address this by twisting the bale on the field during pickup, but crops like corn stover bales on corn stubble fields can and are often damaged by this process resulting in a loss of the bale.

Additionally, if round bales are ejected on a slope such as hillsides they can roll downhill and be damaged or cause a dangerous situation. Operators try to compensate for this by manipulating the tractor/baler combination manually before ejecting the bale, but this process is time consuming and inaccurate. To solve this problem, bale turning devices for round balers have been developed.

Examples of balers with bale turning devices on them are shown in U.S. Pat. No. 6,033,172 to Simon, U.S. Pat. No. 6,073,550 to Goossen, U.S. Pat. No. 7,000,533 to Derscheid, U.S. Pat. No. 7,353,753 to Viaud and British Patent No. GB 2 292 335 to Rout, all of which are incorporated herein by reference in their entirety.

There is a growing interest in harvesting cellulose residue from row-crops for producing bio-fuels such as ethanol for producing energy. Corn, for example, is grown in rows where there are ridges of soil between rows of corn. So when a combine is used to harvest corn, the combine travels parallel to the rows so that the cutters go right down the rows. Another reason to have the combine go parallel to the rows is that it would be a very bumpy ride to travel across each ridge of each row. Similarly, when it comes time to bale corn stover, essentially the corn stalk, leaves and cobs less the corn which was harvested by the combine, it is much easier and more efficient for the baler to travel parallel to the rows than transverse to the rows. That results in bales that are released with the cylindrical axis of the bale transverse to the direction of the corn rows.

As mentioned above, loading those round bales dropped in a corn field to transport them from the corn field cannot be efficiently accomplished by merely traveling parallel to the corn rows because loading equipment requires that the bales be approached from the ends and not from the rounded sides. Furthermore bales from a baler are typically dropped to the ground as soon as they are formed so a new bale can be started. Therefore, even if the field is mostly flat, the cylindrical of the bales would rarely be anything close to being aligned with each other, requiring the bale loading equipment to weave all over the field to get aligned with an end of each bale individually.

If the bales of corn stover in a corn field, for each row of bales as they are being formed, could be turned so that the cylindrical of each bale was generally in alignment from one bale to the next in each row of bales, then bale loading equipment could just be driven through a corn field from one bale to the next bale, etc., in a direction parallel to the ridges in the corn field, to efficiently pick up and load bales without excessive repositioning of the bale loading equipment from one bale to the next adjacent bale. But the prior art bale turners are not entirely suitable for use in row crop fields such as corn fields. For example British Patent No. GB 2 292 335 to Rout uses ground engaging carriage wheels on his bale turner, which would not work well when crossing ridges between rows in a harvested corn field but would cause the carriage to bounce up and down when crossing the ridges.

Accordingly, an improved attachment to balers for accomplishing such general alignment of the cylindrical of each bale in each row of bales, especially in row crop fields, would be highly desirable for increasing the ease and efficiency of loading and removing the bales from the field.

SUMMARY OF THE INVENTION

The present invention relates to a bale turning apparatus for attachment to a baler to generally align the cylindrical of the bales in each row as the bales are released from the baler. Using the present invention, the bales are essentially turned ninety degrees from the orientation of bales from the position that they are typically released from a round baler by merely lifting the rear gate of the baler and allowing the bale to fall on the ground after it has been formed.

By accomplishing this general alignment of the cylindrical of each bale in each row, in a row crop situation, the bale loading operation can be done by driving down the rows in the same direction as the combine and baler have traveled. This means the loading equipment will approach the bales from one end without a constant repositioning of the loading equipment when traveling from one bale to the next.

There is also a benefit in that the bale loader can travel down the same path as the baler and the combine, due to the bale being offset to one side, and the fact that most bale movers load the bale from a position offset from the tractor and the bale mover chassis which typically is towed directly behind the tractor.

In one embodiment of the invention a round baler with a front, a rear, a left side and a right side is used for making round bales from forage material. It includes a baler frame with a carriage support structure having a mostly vertical support axis and ground engaging wheels operatively rotatably attached to the baler frame about a mostly horizontal axis. A rear gate is operatively pivotally attached to the baler frame about a horizontal gate pivot axis and has at least two positions including a closed position wherein the rear gate defines a portion of a bale chamber and an open position wherein the bale chamber is open to allow a formed bale to be discharged. A carriage frame is operatively attached to the carriage support structure of the baler frame rearwardly of the horizontal axis of the ground engaging wheels and to one side of the rear gate and a carriage is operatively attached to the carriage frame. The carriage has a first position wherein a first carriage side closest to the front of the baler is positioned below the rear gate and a second carriage side is positioned closest to the rear of the baler. Additionally the mostly vertical support axis is fixed with respect to the baler frame.

Optionally, the carriage frame is operatively pivotally attached to the baler frame with a second position wherein the carriage frame is pivoted approximately 90 degrees about the mostly vertical support axis wherein the second side of the carriage behind one of the ground engaging wheels and offset from the rear gate. Also, optionally, the carriage can be operatively pivotally attached to the carriage frame along a mostly horizontal axis, the carriage having a first position wherein the second side of the carriage is a first distance above the ground; and a second position wherein the second side of the carriage is a second distance that is less than the first distance for encouraging a bale resting on the carriage to drop off of the second side of the carriage.

In one embodiment, the carriage support structure can further include a cam track and the carriage further comprises a positioning arm with a cam roller that is configured to engage the cam track wherein the cam and camtrack retain the carriage in its first position when the carriage frame is in its first position and retain the carriage in its second position when the carriage frame is in its second position.

Additionally a hydraulic cylinder can be affixed to the carriage frame on one end and to the carriage on the other end wherein the cylinder can move the carriage between its first position and its second position when the carriage frame is in its first position and the cylinder can move the carriage between its first position and its second position when the carriage frame is in its second position.

If desired, a bale catching arm can also be operatively attached to one of the baler frame and/or carriage frame on a first end thereof, the bale catching arm having a second end wherein a bale when resting on the cradle in the pivoted position thereof has a cylindrical axis, a top and a bottom, a side on one side of the cylindrical axis closest to the baler and a side on the other side of the cylindrical axis farthest from the baler; and, wherein at least a portion of the second end of the bale catching arm has at least a bale catching position disposed on the other side of the cylindrical axis farthest from the baler, thereby preventing the bale from rolling on the ground when the bale moves off of the carriage.

Another aspect of the invention disclosed herein relates to a round baler also with a front, a rear, a left side and a right side for making round bales from forage material including a frame with a carriage support structure having a mostly vertical support axis, ground engaging wheels operatively rotatably attached to the frame of the baler about a mostly horizontal axis, a rear gate operatively pivotally attached to the frame about a horizontal gate pivot axis and having at least two positions including a closed position wherein the rear gate defines a portion of a bale chamber and an open position wherein the bale chamber is open to allow a formed bale to be discharged. A carriage frame is also operatively attached to the carriage support structure rearwardly of the horizontal axis of the ground engaging wheels and to one side of the rear gate and a carriage is operatively attached to the carriage frame, the carriage having a first position wherein the carriage retains the formed bale as the center of gravity of the formed bale moves past the first side of the carriage as the bale moves out of the bale chamber and the carriage having a second position wherein the carriage releases the formed bale as the center of gravity of the formed bale moves past the second side of the carriage.

Optionally, the carriage can be operatively pivotally attached to the carriage mounting structure along a mostly horizontal axis the carriage having a first position wherein the second side of the carriage is a first distance above the ground and a second position wherein the second side of the carriage is a second distance that is less than the first distance for encouraging a bale resting on the carriage to drop off of the second side of the carriage.

Still another aspect of the present invention disclosed herein relates to a round baler, also with a front, a rear, a left side and a right side for making round bales from forage material and further having a frame with a carriage support structure with a mostly vertical support axis. Ground engaging wheels are operatively rotatably attached to the frame of the baler about a mostly horizontal axis. A rear gate is operatively pivotally attached to the frame about a horizontal gate pivot axis and has at least two positions including a closed position wherein the rear gate defines a portion of a bale chamber and an open position wherein the bale chamber is open to allow a formed bale to be discharged. A carriage frame is operatively attached to the carriage support structure rearwardly of the horizontal axis of the ground engaging wheels and to one side of the rear gate and a carriage is operatively attached to the carriage frame. The carriage has a first position wherein the carriage is disposed at least partially below the rear gate to catch a formed round bale when the rear gate is moved to its open position wherein the bale moves from the bale chamber, and at least partially past the first side of the carriage and a second position approximately ninety degrees from the first position whereby a bale on the carriage is turned approximately ninety degrees from the first position thereof. Additionally there is a stop mechanism operatively attached to the carriage frame, the stop mechanism being for stopping movement of the carriage at the second position thereof when the carriage is moving from the first to the second position of the carriage whereby inertia of the bale moving from the first position of the carriage to the second position of the carriage will cause the bale to fall off of the second side of the carriage when the carriage is stopped at the second position of the carriage.

BRIEF DESCRIPTION OF THE DRAWINGS

The above needs are at least partially met through provision of the method and apparatus described in the following detailed description, particularly when studied in conjunction with the drawings, wherein:

FIG. 3 is a schematic view of FIG. 2 from the other side thereof; FIG. 3 also shows an alternate embodiment of FIG. 6;

FIG. 4 is a schematic view looking rearwardly from the tractor after the bale has been turned ninety degrees from the FIG. 3 position about the vertical axis shown in dashed lines in FIGS. 3 and 4;

FIG. 5 is a schematic view looking forwardly from the rear of the baler after the bale has been turned ninety degrees from the FIG. 3 position about the vertical axis shown in dashed lines in FIGS. 3-5;

FIG. 6 is a schematic view of the alternate embodiment referred to above with respect to FIG. 3, looking forwardly from the rear of the baler after the bale has been turned ninety degrees from the FIG. 3 position and furthermore as the carriage is pivoted about a substantially vertical axis that is tipped out to one side as shown (but appears as a vertical axis in FIG. 3), the carriage moves from the level position shown in FIG. 3 to the tipped position shown in FIG. 6 to cause the bale to drop off of the carriage to the right as shown in FIG. 6 immediately after the carriage has been so pivoted;

FIG. 7 is a top schematic view of the lower rear part of the baler with the present invention attached thereto with the carriage not pivoted and not tilted in the position it would be in when a bale is being made and in the position of FIG. 2 when the bale moves from the baling chamber to rest on the carriage;

FIG. 8 is a perspective view of the bale turning attachment of the present invention detached from the baler in the position shown in FIGS. 2 and 7 showing both the mostly vertical and mostly horizontal pivotal axes which will be described below;

FIG. 9 is another perspective view of the bale turning attachment of the present invention detached from the baler in the position shown in shown in FIGS. 2 and 7;

FIG. 16 is a top schematic view of the lower rear part of the baler with the present invention attached thereto with the carriage pivoted ninety degrees from the FIG. 3 to the position shown in FIGS. 4 and 5 but not tilted;

FIG. 17 is a perspective view of the bale turning attachment of the present invention detached from the baler as in FIG. 16, in the pivoted position shown in FIGS. 4 and 5, but not tilted;

FIG. 18 is another perspective view of the bale turning attachment of the present invention detached from the baler in the position shown in FIGS. 16 and 17, not tilted;

FIG. 19 is a top schematic view of the lower rear part of the baler with the present invention attached thereto with the carriage pivoted ninety degrees from the FIG. 3 to the position shown in FIGS. 4 and 5 using a hydraulic cylinder to also tilt it about a horizontal axis;

FIG. 20 is a perspective view of the bale turning attachment of the present invention detached from the baler in the position shown in FIGS. 4 and 5 and showing both the mostly vertical and mostly horizontal pivotal axes referred to above using a hydraulic cylinder to pivot it about the vertical axis and another hydraulic cylinder to tilt it about the horizontal axis;

FIG. 21 is another perspective view of the bale turning attachment of the present invention detached from the baler in the position shown in FIGS. 6, 19 and 20;

FIG. 24 is a top schematic view of another embodiment of the present invention showing the lower rear part of the baler with the present invention attached thereto with the carriage not pivoted and not tilted in the position it would be in when a bale is being made and in the position of FIG. 3 when the bale has moved from the baling chamber to rest on the carriage;

FIG. 25 is a perspective view of the bale turning attachment of FIG. 24 detached from the baler in the position shown in FIG. 3 and showing both the mostly vertical and mostly horizontal pivotal axes which will be described below;

FIG. 26 is another perspective view of the bale turning attachment of the present invention detached from the baler in the position shown in shown in FIG. 24;

FIG. 27 is a perspective view of the embodiment of FIGS. 24-26 showing a cam and cam follower to accomplish automatic pivoting about both the vertical axis and horizontal axis when moving between the positions of the carriage between the FIG. 3 and FIG. 6 positions, FIG. 27 showing it similar to the tilted position of FIG. 6;

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
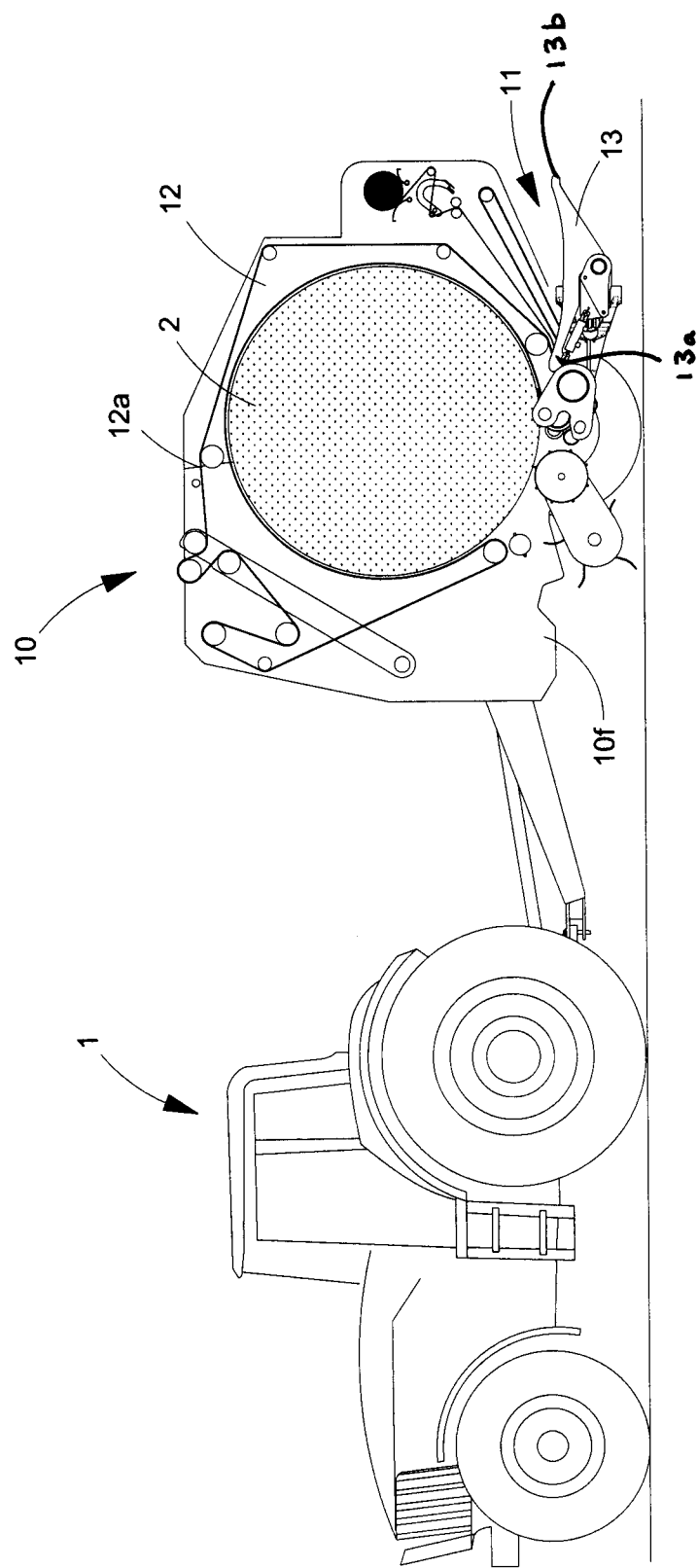
FIG. 1 is a side elevational view of a tractor towing a baler with a bale turner constructed in accordance with a preferred embodiment of the present invention attached thereto, showing a bale in the finishing stages of being formed in the baler.

Referring now to the drawings, wherein like reference numerals indicate identical or similar parts throughout the several views, FIG. 1 shows a baler 10 being towed by a tractor 1, in the process of making a bale 2, the baler 10 having a bale turning apparatus 11 attached thereto.

Figure 2:
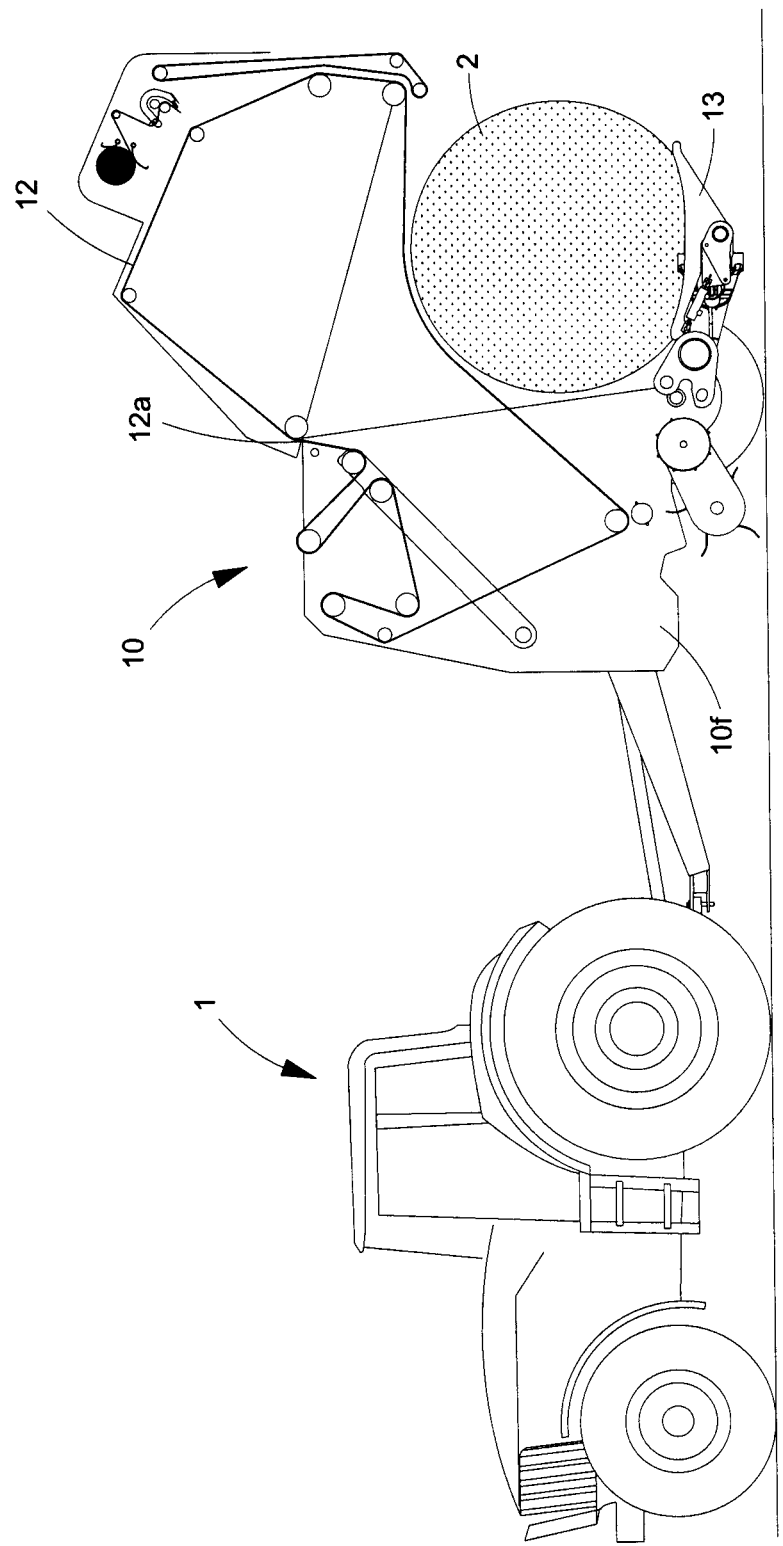
FIG. 2 is a side elevational view of a tractor towing a baler with a bale turner constructed as in FIG. 1 but with the rear gate of the baler being open with the finished bale resting on a carriage.
Figure 10:
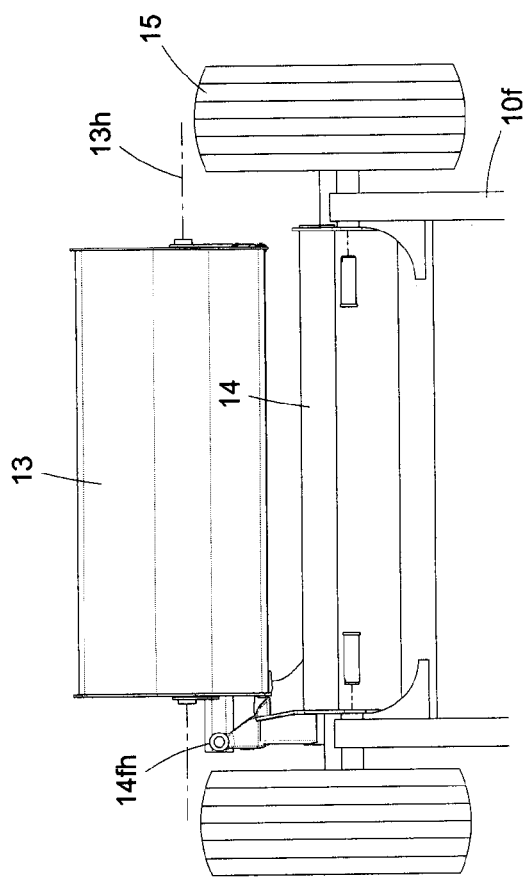
FIG. 10 is a top schematic view of the lower rear part of the baler with the present invention attached thereto with the carriage not pivoted and but tilted in the position of FIG. 6 when the bale moves from the carriage to the ground.

After the bale 2 has been completed, the rear gate 12 is pivoted up about horizontal axis 12a as shown in FIG. 2, allowing the bale to move rearwardly onto a cradle 13 which is part of turning device 11 of the present invention.

FIGS. 3-5 show sequentially the next few steps of how the present invention operates in two of its most useful modes, FIG. 3 showing the FIG. 2 position with the bale 2 resting on cradle 13. Then, the bale turning apparatus 11 pivots the cradle 13 and bale 2 ninety degrees (90°) along vertical axis 13v to a position to one side of the baler 12 as shown looking from the tractor 1 in FIG. 4 and looking from the rear of the baler in FIG. 5.

FIG. 6 is an alternate embodiment where the mostly vertical axis 13vt is tipped to one side that shows how the cradle 13, having been turned ninety degrees about a vertical axis (90°) from the position shown in FIG. 3 also tips the cradle 13 from the FIG. 3 position to the FIG. 6 position due only to the turning about the axis 13vt. The mostly vertical axis 13vt of FIG. 6 is straight up and down vertical when viewed from the side as shown in FIG. 6 and is identical to the vertical axis 13v when viewed from the angle shown in FIG. 3.

Figure 22:
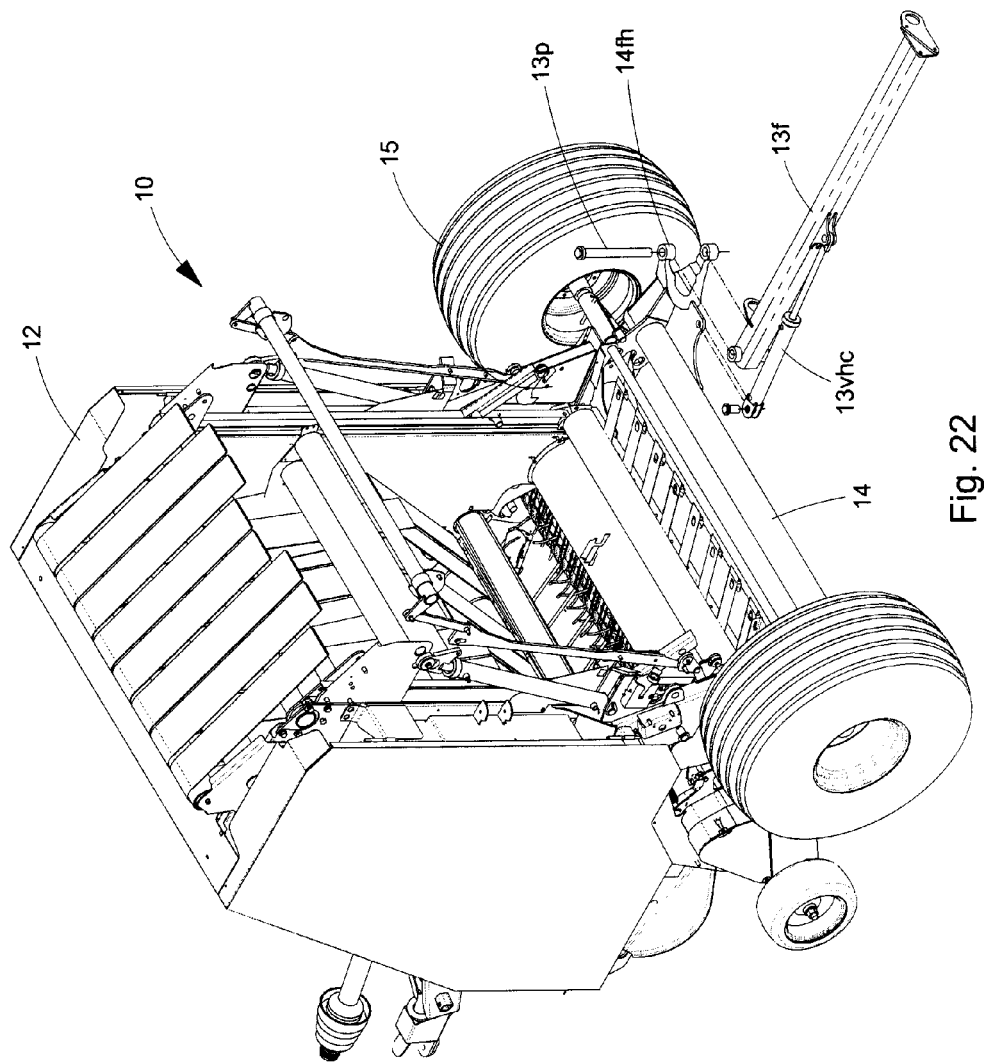
FIG. 22 is a perspective exploded view of the rear of the baler with the carriage frame pivoted ninety degrees as shown in FIGS. 6 and 16-20 for example.
Figure 23:
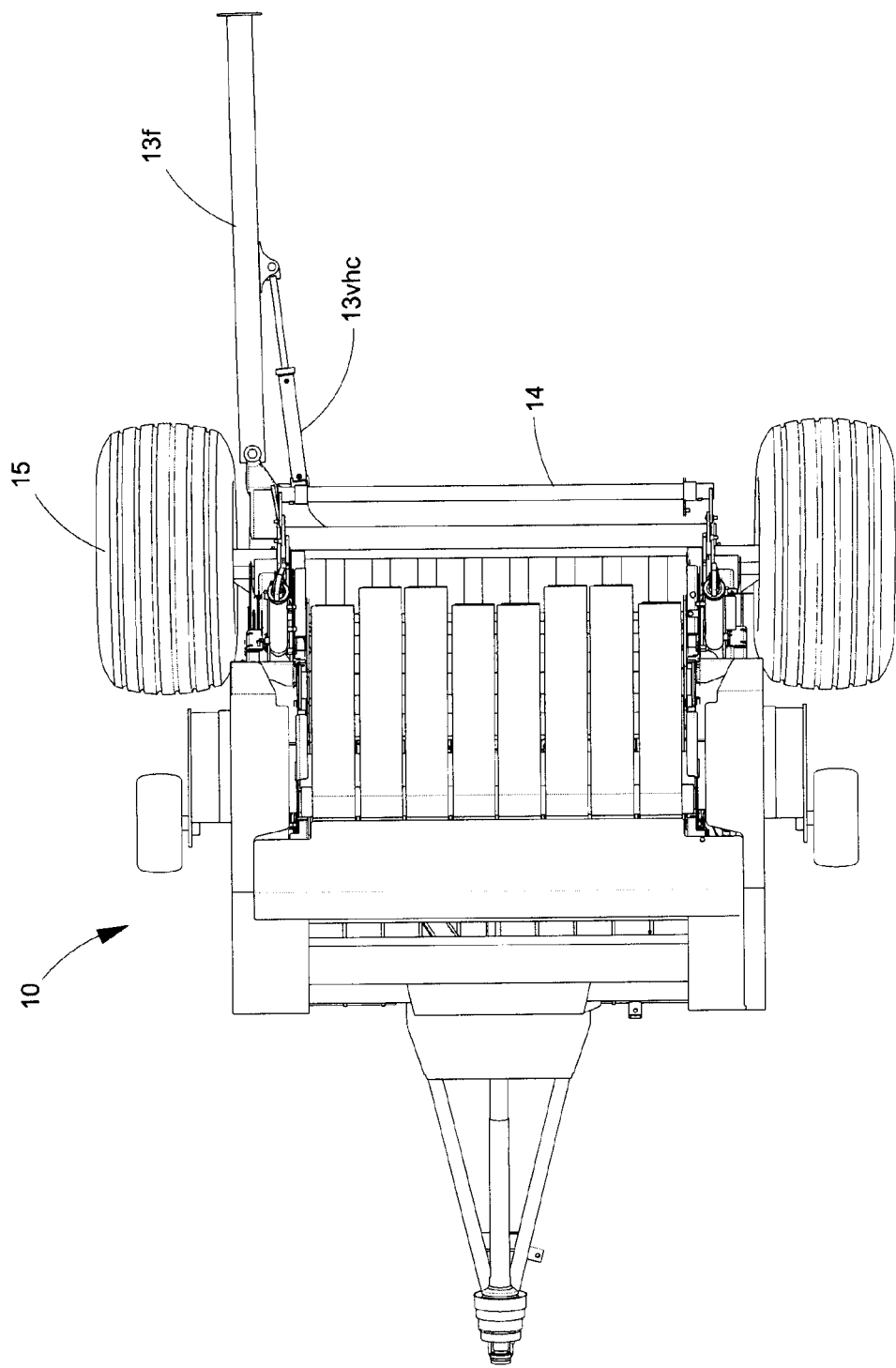
FIG. 23 is a top plan view of the rear of the baler with the carriage frame pivoted ninety degrees as shown in FIGS. 6 and 16-20 for example.

The round baler 10 has a baler frame 10f with a carriage support structure 14 (See FIGS. 12, 22 and 23) attached to the baler frame 10f about the mostly vertical support axis 13v as shown in FIGS. 7-9. Ground engaging wheels 15 are rotatably attached to the baler frame 10f about a mostly horizontal axis.

The rear gate 12, is pivotally attached to the baler frame 10f about a horizontal gate pivot axis 12h and has at least two positions including a closed position shown in FIG. 1 wherein the rear gate defines a portion of a baling chamber and an open position, shown in FIGS. 2 and 6, wherein the baling chamber is open to allow a formed bale 2 to be discharged.

A carriage frame 13f is attached to the carriage support structure 14 of the baler frame 10f rearwardly of the horizontal axis of the ground engaging wheels 15 and to one side of the rear gate 12.

The carriage frame 13f is pivotally attached along axis 13v to the carriage support structure 14, via carriage frame hinge pin 13p extending through clevis like carriage support hinge part 14fh (FIG. 22), the carriage 13 having a first vertically pivoted position shown in FIGS. 1, 3 and 7-9 wherein a first carriage side 13a is closest to the front of the baler 10 and positioned below the rear gate 12 and a second carriage side 13b closest to the rear of the baler 10. It is important to note that the mostly vertical support axis 13v is fixed with respect to the baler frame 10f.

Figure 15:
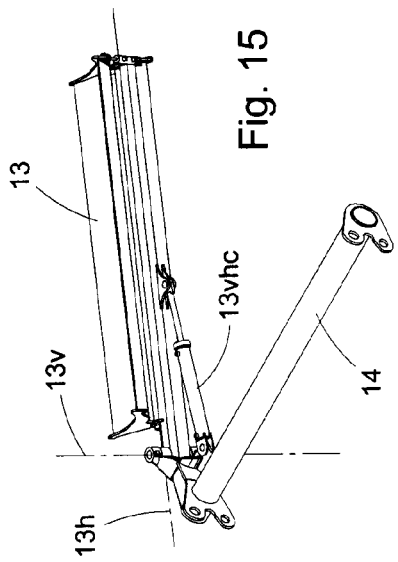
FIG. 15 is another perspective view of the bale turning attachment of the present invention detached from the baler in a position like that shown in FIGS. 13 and 14 between the positions shown in FIGS. 3 and 4 using a hydraulic cylinder to tilt it similar to what is shown in FIG. 6 and showing both the mostly vertical and mostly horizontal pivotal axes referred to above.
Figure 13:
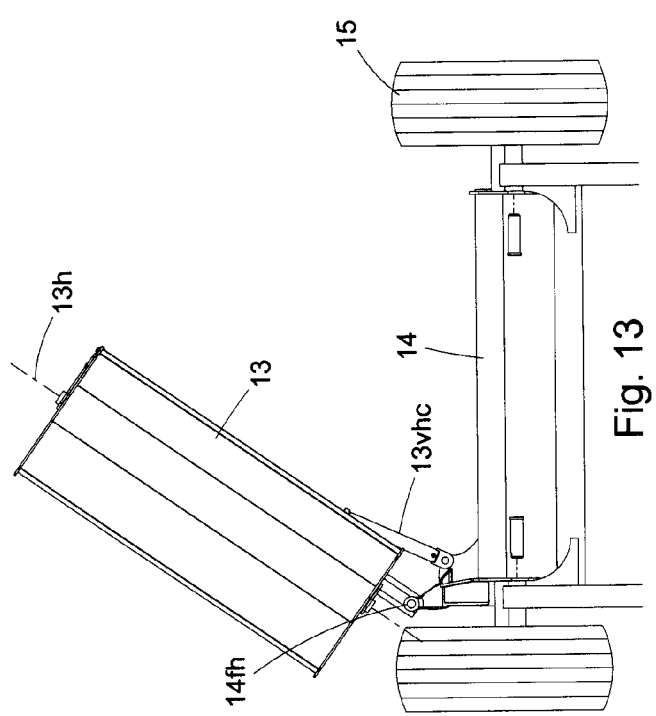
FIG. 13 is a top view of the bale turning attachment of the present invention detached from the baler in a position between the positions shown in FIGS. 3 and 4, but additionally tilted similar to what is shown in FIG. 6.
Figure 14:
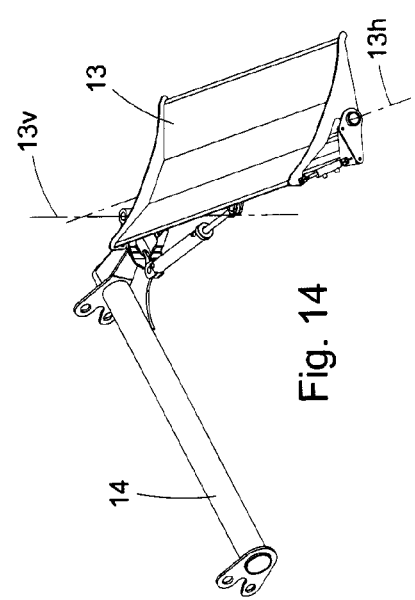
FIG. 14 is a perspective view of the bale turning attachment of the present invention detached from the baler in a position like that shown in FIG. 13 between the positions shown in FIGS. 3 and 4 and showing both the mostly vertical and mostly horizontal pivotal axes referred to above, using a hydraulic cylinder to tilt it similar to what is shown in FIG. 6.

The carriage frame 13f also has a second vertically pivoted position shown in FIGS. 16-18 wherein the carriage frame 13f is pivoted approximately 90 degrees about the mostly vertical support axis 13v wherein the second side 13b of the carriage 13 is behind one of the ground engaging wheels and offset from the rear gate 12. Note that when the carriage 13 is pivoting between the FIGS. 1, 3 and 7-9 position to the FIGS. 16-19 position, it will transition through intermediate positions between the first and second positions, one example of such intermediate position being shown in FIGS. 13-15. A hydraulic cylinder 13vhc is pivotally attached along a vertical axis at pin 13pa to the carriage support structure 14 ( ) and pivotally attached along another vertical axis 13pb to the carriage 13 itself (See FIG. 27.)

Figure 12:
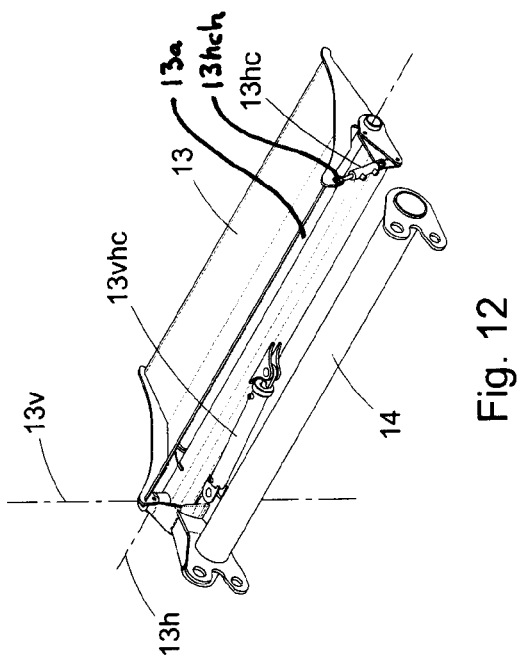
FIG. 12 is another perspective view of the bale turning attachment of the present invention detached from the baler in the position shown in shown in FIGS. 10 and 11.
Figure 11:
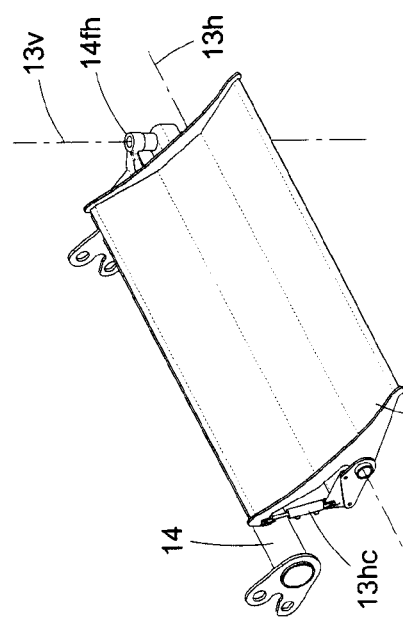
FIG. 11 is a perspective view of the bale turning attachment of the present invention detached from the baler in the position shown in FIG. 6 and showing both the mostly vertical and mostly horizontal pivotal axes which will be described below.
Figure 37:
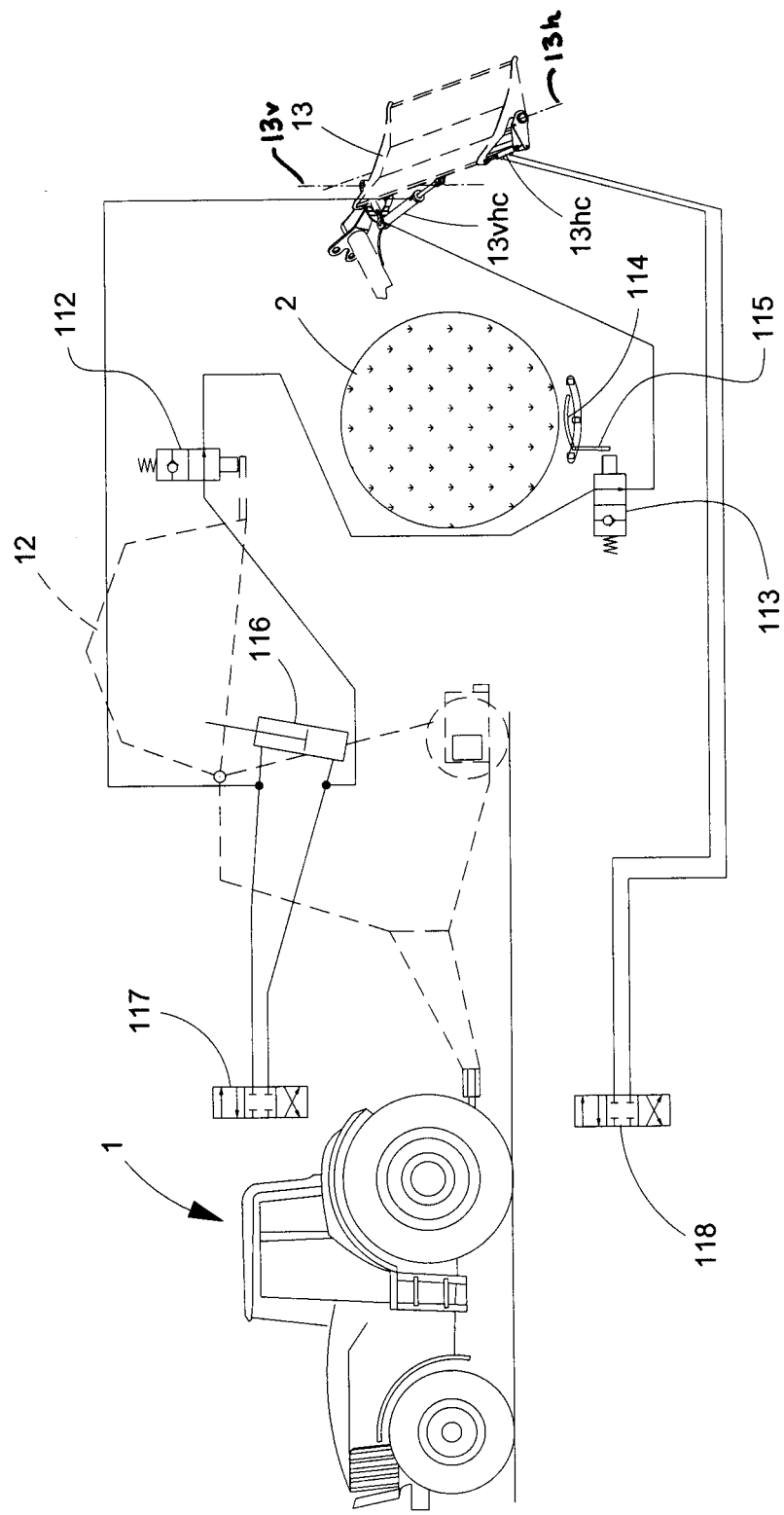
FIG. 37 illustrates a schematic view of a hydraulic system utilized to coordinate the movements of the associated components of the embodiment of FIGS. 24-31 and 34-36.

The carriage 13, except in the FIG. 6 embodiment, is pivotally mounted about the horizontal axis 13h to the carriage frame 13f as can best be seen in FIG. 12. This permits the carriage 13 to not only pivot about vertical axis 13v about the carriage support frame 13f but allows the carriage to pivot about horizontal axis 13h as well. The carriage 13 is selectively pivoted by using a hydraulic cylinder 13hc pivotally attached at pin 13hch to the first end 13a of the carriage 13. The hydraulic system for this embodiment is illustrated in FIG. 37 including a hydraulic circuit specifically for controlling the position of hydraulic cylinder 13hc. This circuit will allow the carriage to be rotated about the horizontal axis 13h independent of the position of the carriage frame about the vertical axis 13v. The hydraulic cylinder 13hc is also pivotally attached at the other end thereof to an arm 13arm, the arm 13arm being rigidly attached to the carriage 13 at one end thereof. The carriage 13 has a first position (FIGS. 7-9 and 16-18) wherein the second side 13b of the carriage is a first distance above the ground and a second position (FIGS. 10-12 and 19-21) wherein the second side 13b of the carriage 13 is a second distance that is less than the first distance for urging a bale resting on the carriage to roll off of the second side 13b of the carriage. Pivoting the carriage 13 about a horizontal axis is one way to get the bale to fall off of the carriage.

Referring now again to FIG. 6, an alternate embodiment, the bale is urged to fall off of the carriage 13 by merely tipping the mostly vertical axis 13vt. After the bale has been turned ninety degrees from the FIG. 3 position to the FIG. 6 position the carriage is pivoted about a substantially vertical axis that is tipped out to one side and as the carriage moves from the level position shown in FIG. 3 to the tipped position shown in FIG. 6 and that is what causes the bale to drop off of the carriage to the right as shown in FIG. 6 immediately after the carriage has been so pivoted.

A third way to urge the bale off of the carriage 13 is to use a cam device shown in FIG. 27, which is a front left perspective view of the embodiment of FIGS. 24-26 showing a cam and cam follower. These components automatically pivot the carriage about the horizontal axis as it moves between the position shown in FIG. 27 and the position shown in FIG. 36. FIG. 27 shows the tilted position, accomplishing the tipping of the carriage using a cam 22 and cam follower 21. Assisting the process is the fact that when the outer end of the cam follower 21 hits the outer end of the cam 22 it acts as a stop so that sudden stopping of the carriage 13 results in the momentum and inertia of the bale to cause the bale to drop off of the carriage. This stop can be provided without a cam/cam follower or tipping function and it will still operate to cause the inertia alone to cause the bale to fall off of the carriage 13.

Figure 28:
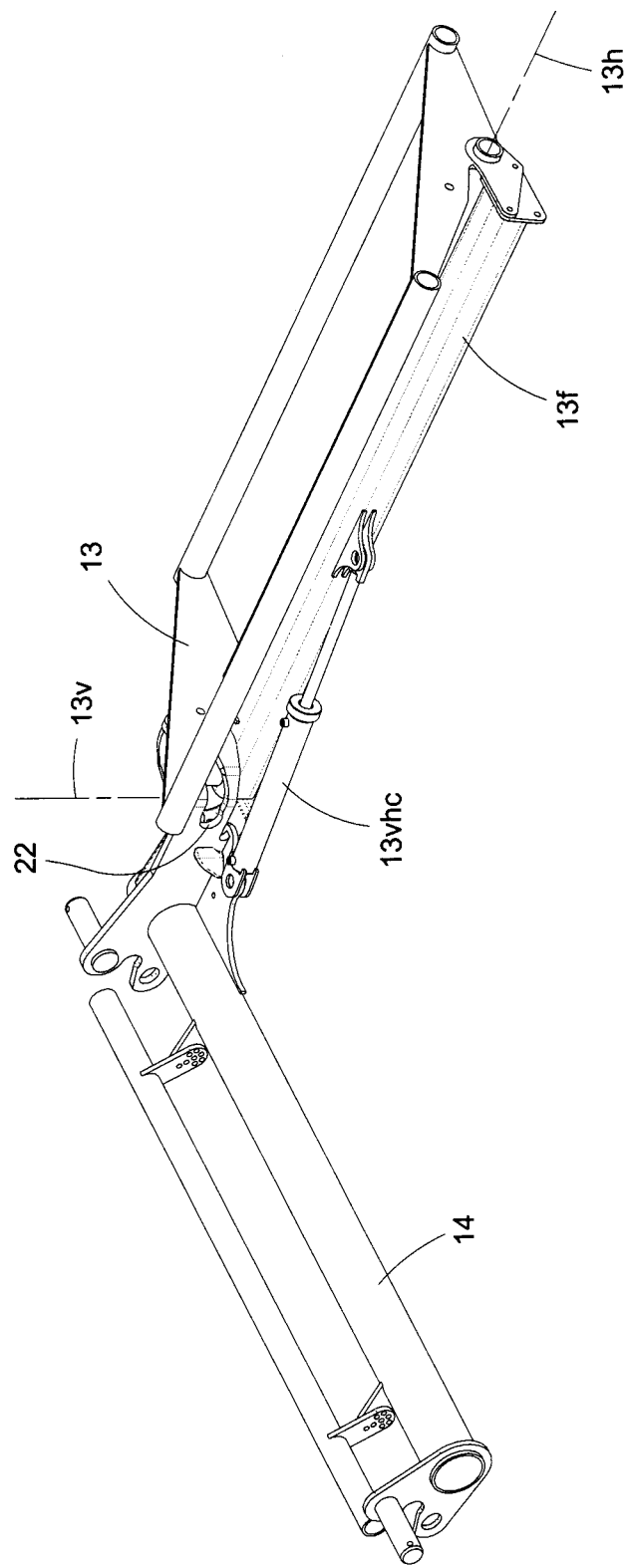
FIG. 28 is another perspective view of the embodiment of FIGS. 24-26 showing a cam and cam follower to accomplish automatic pivoting about both the vertical axis and horizontal axis when moving between the positions of the carriage between the FIG. 3 and FIG. 6 positions, FIG. 28 showing it similar to the tilted position of FIG. 6.

FIG. 28 is a rear left perspective view of the embodiment of FIGS. 24-26 showing a cam 22 and cam follower 21.

FIG. 27 is a perspective view of the embodiment of FIGS. 24-26 showing a cam and cam follower.

Figure 29:
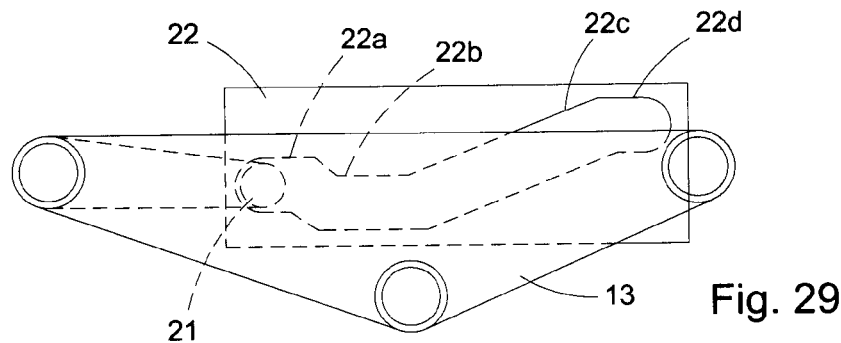
FIG. 29 is a side view of the cam and cam follower in solid and dashed/hidden lines shown in the position of the FIGS. 6 and 24-26 where the carriage is in a position to receive a bale from the baling chamber when the rear gate is opened.
Figure 30:
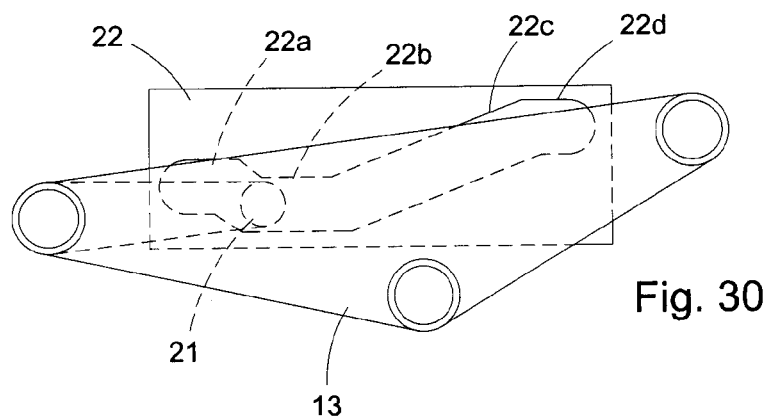
FIG. 30 is a side view of the cam and cam follower in solid and dashed/hidden lines shown in the position approximately half way between the positions of the FIGS. 3 and 6.
Figure 31:
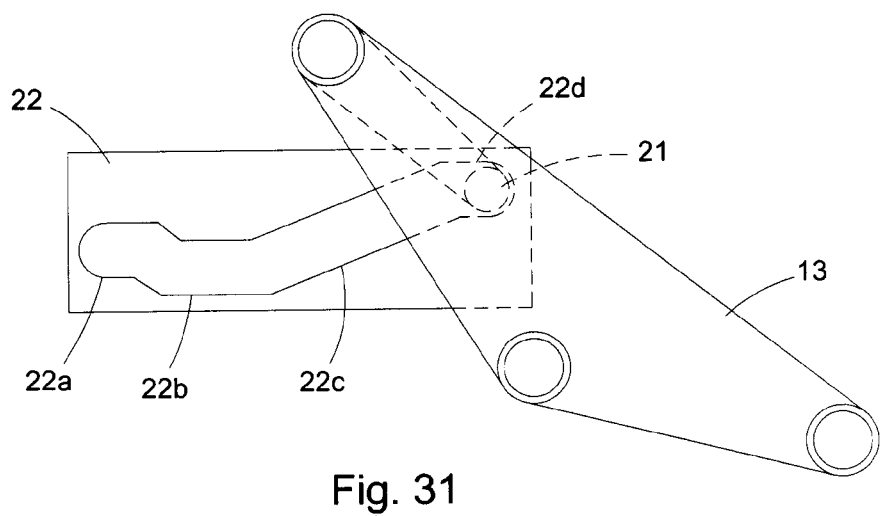
FIG. 31 is a side view of the cam and cam follower in solid and dashed/hidden lines shown in a position similar to the position of the FIG. 6 where the carriage is pivoted ninety degrees from the FIGS. 3, 27, 28 and 29 position and also pivoted about a horizontal axis to release a bale from the carriage.

FIGS. 29-31 are schematic representations of the carriage, cam and cam follower. FIG. 29 is a side view that corresponds to FIG. 34, of the cam 22 and cam follower 21 in solid and dashed/hidden lines shown where the carriage is in a level position to receive a bale from the baling chamber when the rear gate is opened like what is shown in FIG. 2. In FIG. 29 the cam follower 21 is in the section 22a of the cam follower 22.

FIG. 30 is a side view of the cam and cam follower in solid and dashed/hidden lines shown in the position approximately half way between the positions of the FIGS. 2 and 27. The movement of the carriage frame and cam follower relative to the cam is illustrated in this series of schematic drawings as a translation. In the actual embodiment this movement is actually caused by the rotation of the carriage frame about the vertical axis 13v (See FIGS. 25 and 26). The cam is an arcuate plate, wherein it is illustrated in these schematic drawings as a flat plate. Section 22b of the cam can be positioned to cause the carriage to rotate about the horizontal axis 13h in a direction to improve the capability of the carriage to hold the bale securely as it moves out of the bale forming chamber of the baler.

Figure 38:
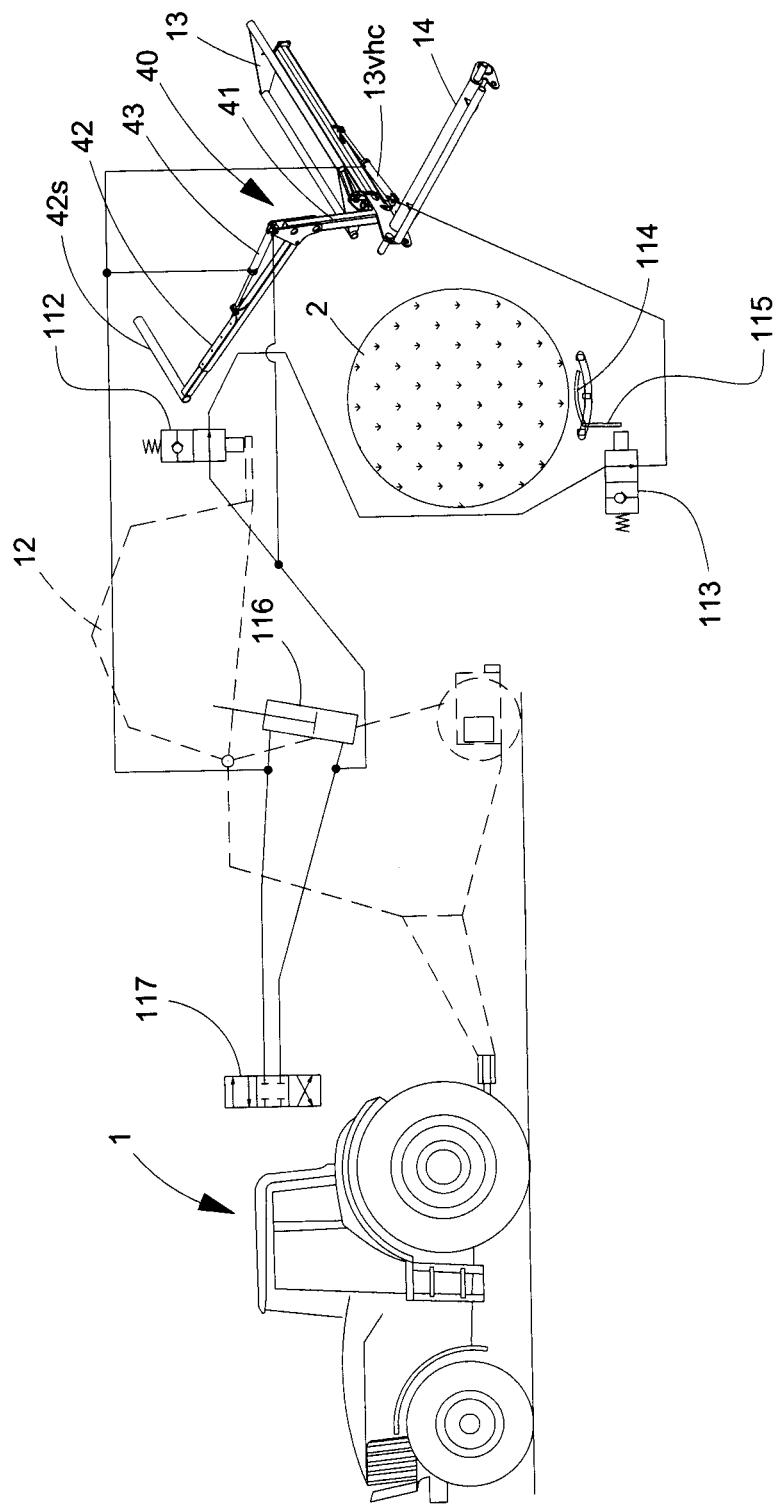
FIG. 38 illustrates a schematic view of a hydraulic system utilized to coordinate the movements of the associated components of the alternate embodiment illustrated in FIG. 6.

As the carriage frame rotates about the vertical axis 13v, the cam follower 21 moves through the part 22c to the part 22d shown in FIG. 31 corresponding to the position that the carriage is finally in the position shown in FIGS. 27 and 28, and wherein the carriage 13 is fully pivoted ninety degrees from the FIG. 2 position. As a result of and at the same time, the cam 22 and cam follower 21 has caused the carriage to pivot about horizontal axis 13h to a tipped position to urge the bale to roll off other carriage 13 in a direction away from the baler. FIG. 38 illustrates the hydraulic system associated with this embodiment, wherein there is not a separate hydraulic circuit for controlling the position of the carriage relative to the carriage frame. This FIG. 38 also illustrates an additional aspect of this invention, an L-shaped arm useful for controlling the movement of the bale across the ground after it drops off of the carriage.

Figure 32:
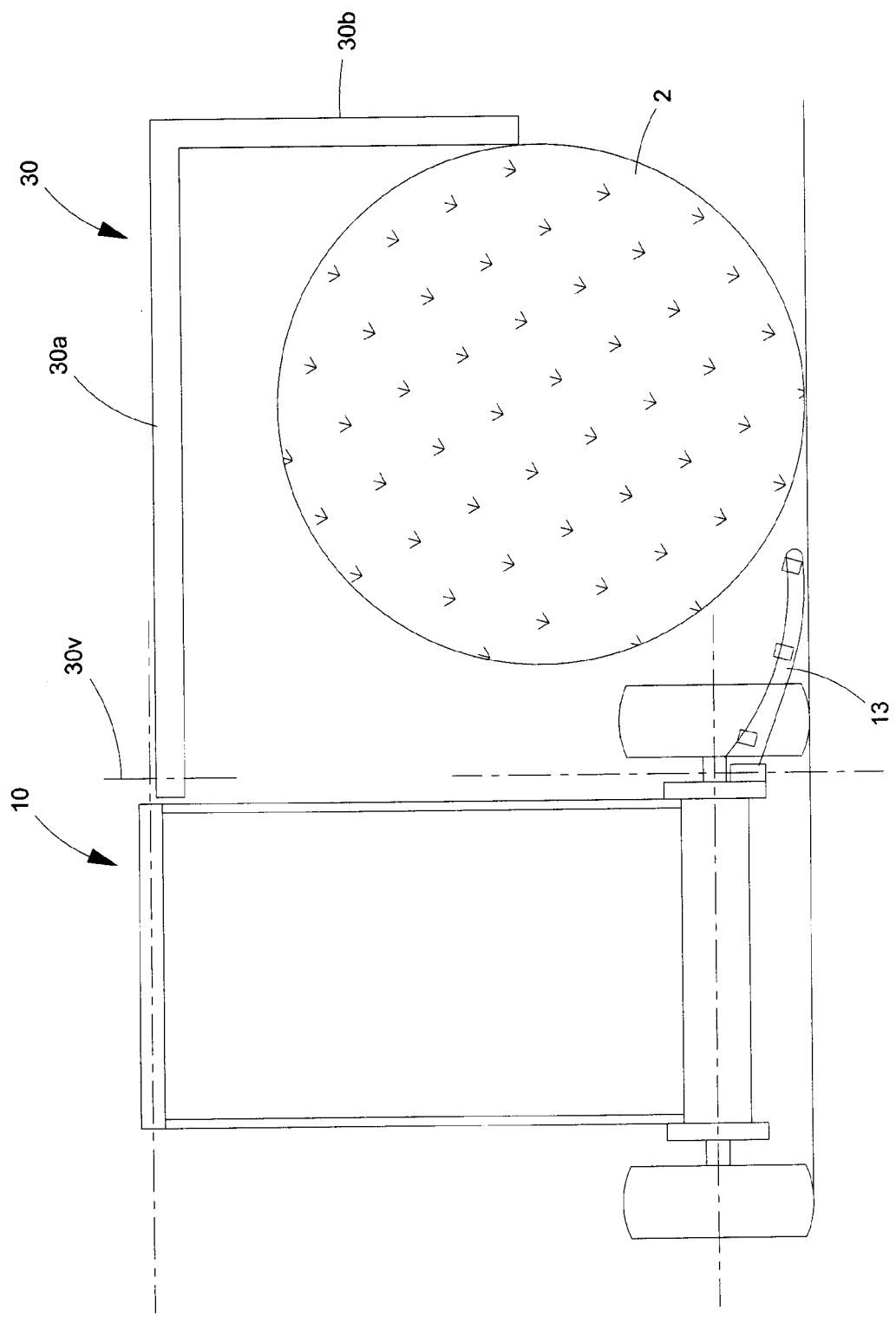
FIG. 32 is a rear view of the baler similar to FIG. 6, but showing the bale having moved to the ground and prevented from rolling to the right as shown in this view by an L-shaped arm pivotally attached about a substantially vertical axis.

FIG. 32 is a rear view of the baler 10 similar to FIG. 6, but showing the bale 2 having moved to the ground and prevented from rolling to the right as shown in this view by an L-shaped arm 30 pivotally attached about a substantially vertical axis 30v. The arm 30, with horizontal leg 30a and vertical leg 30b can be folded against the side of the baler when the carriage 13 is not in the position shown in FIG. 32.

Figure 33:
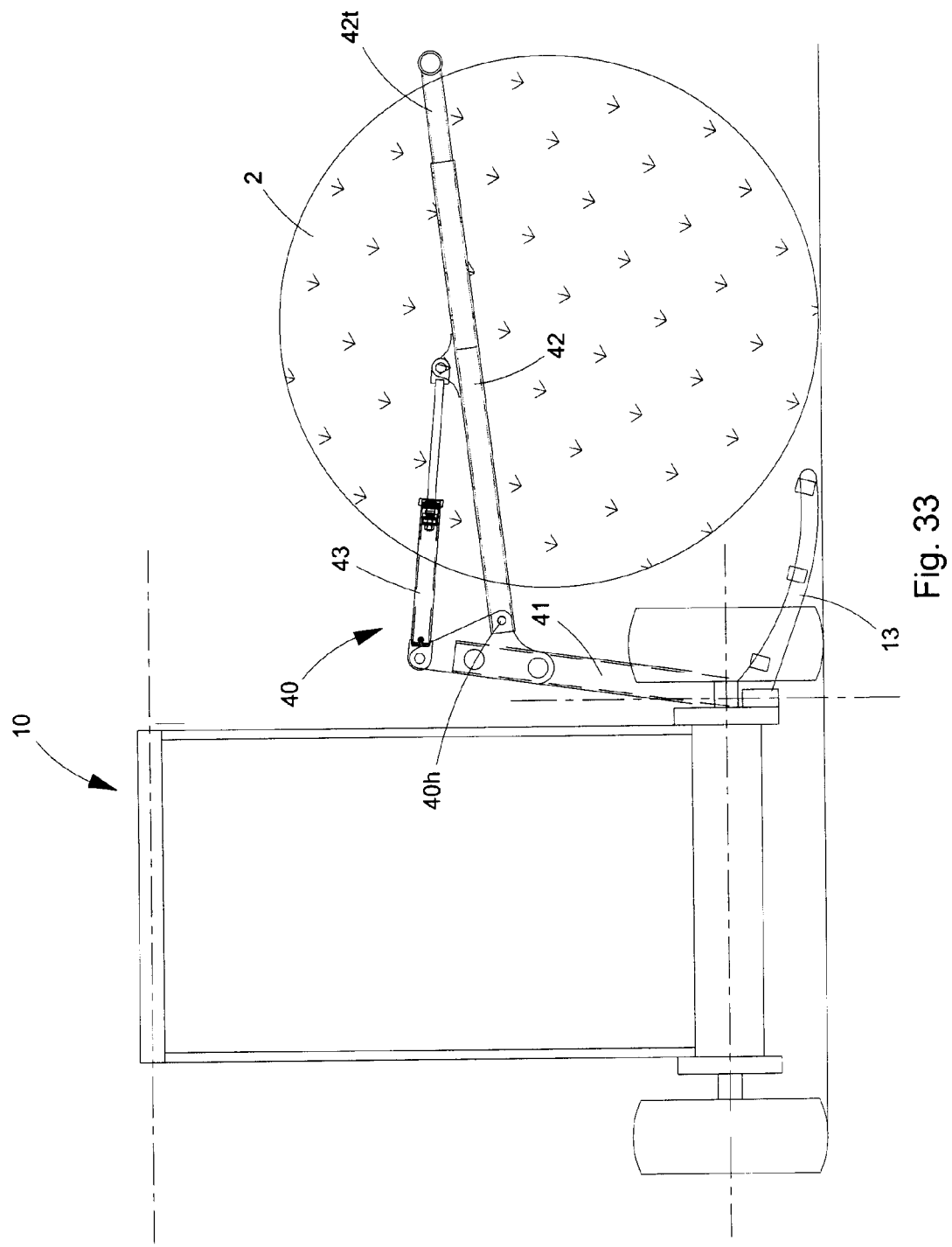
FIG. 33 is a rear view of the baler similar to the device of FIG. 32, but showing the bale having moved to the ground and prevented from rolling to the right as shown in this view by an L-shaped arm pivotally attached about a substantially horizontal axis.
Figure 34:
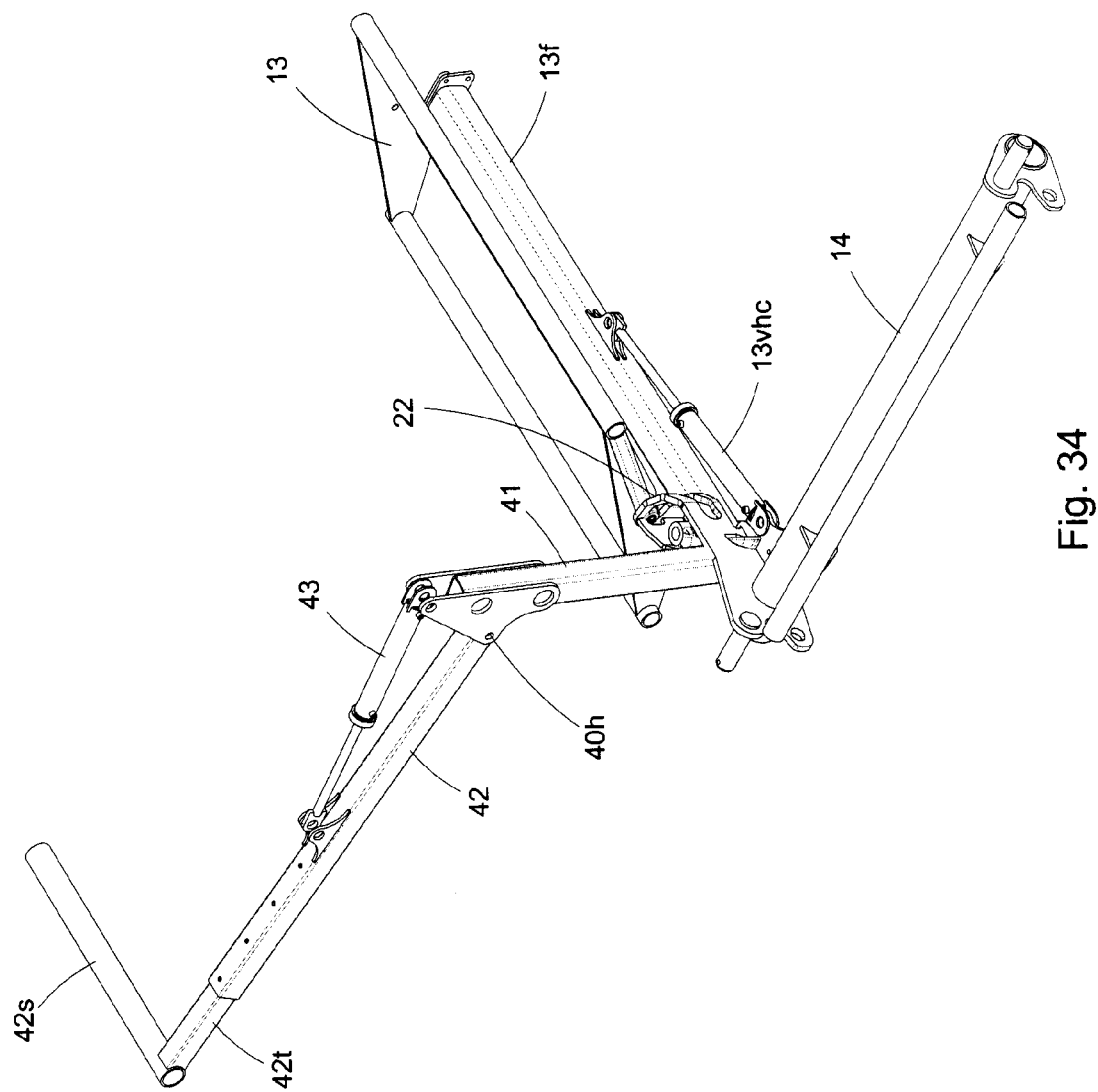
FIG. 34 is a perspective view of the device of FIG. 33 using the cam operated embodiment of FIGS. 24-31 to pivot the carriage and bale ninety degrees and pivot the carriage to cause the bale to fall off of the carriage, while also moving a bale catching arm to the right side of the bale as shown in FIGS. 33-35 to prevent the bale from moving too far to the right before coming to rest, thereby making it easier for bale loading equipment to travel the same basic path as the baler during a bale loading operation.
Figure 35:
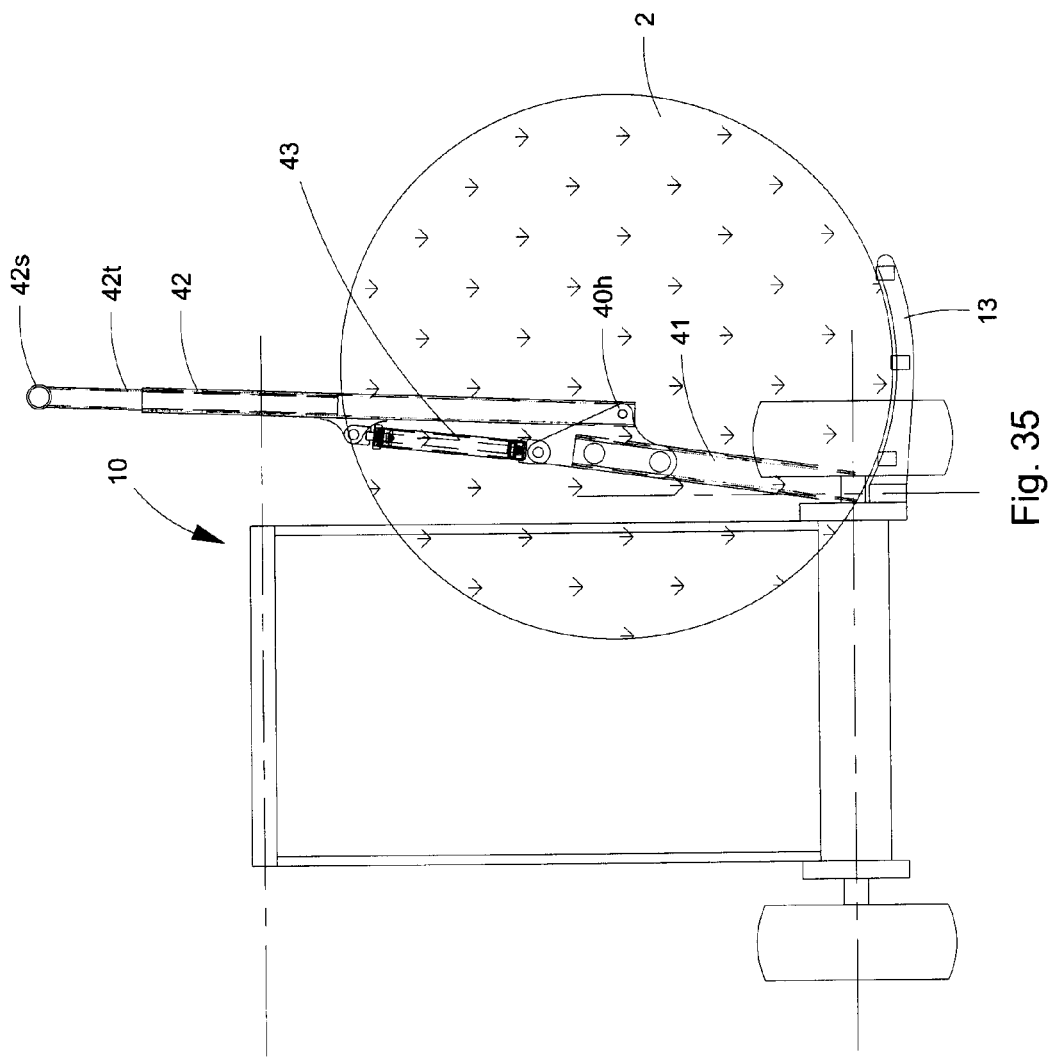
FIG. 35 is a rear view of the FIGS. 33 and 34 bale alignment arm just before it is deployed to the FIGS. 33 and 34 position thereof, when the carriage is in the position of FIGS. 4 and 5.
Figure 36:
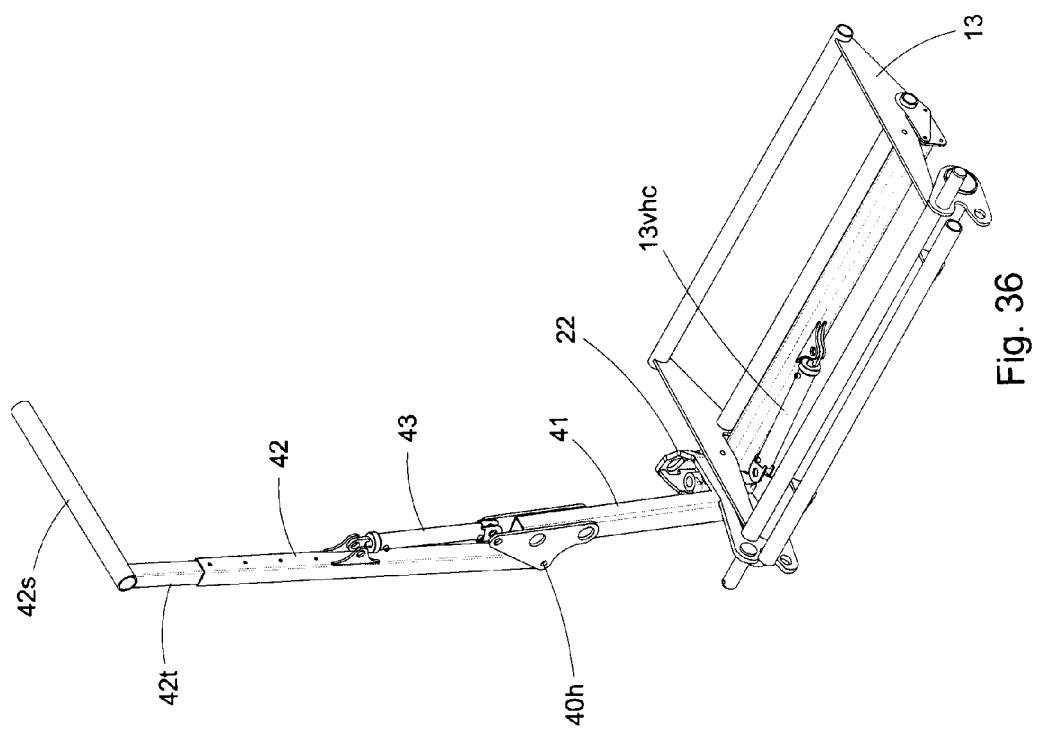
FIG. 36 is a perspective view of the carriage and bale catching arm in the position shown in FIG. 35.

FIG. 33 is a rear view of the baler similar to the device of FIG. 32, but showing the bale having moved to the ground and prevented from rolling to the right as shown in this view by an L-shaped arm with adjustable parts 42/42t/42s which are also shown in FIGS. 34-36, which L-shaped arm is pivotally attached about a substantially horizontal axis 40h.

FIG. 34 is perspective view of the device of FIG. 33 using the cam operated embodiment of FIGS. 24-31 to pivot the carriage and bale ninety degrees and pivot the carriage 13 to cause the bale 2 to fall off of the carriage 13, while also moving a bale 2 catching arm 42/42t/42s to the right side of the bale as shown in FIG. 33 to prevent the bale from moving too far to the right before coming to rest, thereby making it easier for bale loading equipment to travel the same basic path as the baler during a bale loading operation.

FIG. 35 is a rear view of the FIGS. 33 and 34 bale alignment arm just before it is deployed to the FIGS. 33 and 34 position thereof, when the carriage is in the position of FIGS. 4 and 5.

FIG. 36 is a perspective view of the carriage and bale catching arm in the position shown in FIG. 35.

FIGS. 37 and 38 illustrate hydraulic systems utilized to coordinate the movements of the associated components. FIG. 37 illustrates, as noted previously, the embodiment wherein the carriage is rotated in the carriage frame about axis 13h by a hydraulic cylinder. This allows the carriage 13 to be rotated to drop the bale 2 at any desired position of the carriage frame 13f. With this arrangement the bale 2 can be dropped straight behind the baler 10, with its axis perpendicular to the travel direction, or rotated 90 degrees so that the axis of the bale 2 is parallel to the travel direction, or any angle there between, as controlled by the cylinder 13vhc that causes the carriage frame to rotate about vertical axis 13v.

The cylinder 13vhc that causes the carriage frame to rotate about vertical axis 13v is activated by a hydraulic line that is connected in this embodiment to two sequence valves 112/113. The first sequence valve 112 is activated by the position of the tailgate 12. When the tailgate 12 is in its open position, this valve 112 opens to allow oil to flow to the second sequence valve 113 that is activated by the position of a bale sensor 114. The bale sensor 114 is activated by a bale 2 as it falls into the carriage 13, once in the carriage 13 the bale 2 causes a linkage 115 to activate the second sequence valve 113 that will allow oil to flow the cylinder 13vhc that rotates the carriage 13 about the vertical axis 13v.

This circuit is connected in series to the cylinder 116 that raises the tailgate 12, which cylinder 116 is connected to a remote valve 117 of the tractor. The operator then controls the bale discharge by moving a remote valve 117 to the position to raise the tailgate 12, and then continues to hold the remote valve 117 in that position to subsequently rotate the carriage 13 to move and discharge the bale 2. The rotation of the carriage 13 will determine the orientation of the axis of the bale 2 relative to the baler 10. This control can be accomplished manually, allowing the operator to control the remote valve 118 of the tractor 1. It could also be accomplished automatically, if a control device on the tractor 1 or the baler 10 was allowed to automatically control the cylinder 13hc that rotates the carriage frame 13f (FIGS. 17 and 18).

FIG. 38 illustrates an alternate embodiment that works in conjunction with the embodiment illustrated in FIG. 6, wherein the pivot axis 13vt is oriented to reliably discharge the bale 2 when turned 90 degrees, or with the embodiment that utilizes the cam and cam follower (See FIGS. 24-33), to rotate the carriage 13 about the axis 13h to discharge the bale 2. Thus, there is no need for a separate hydraulic circuit to control the position of the carriage 13 relative to the carriage frame 13. This embodiment illustrates the same sequence valves 112/113, but also illustrates the additional mechanism 40 used to stop the bale 2 as it is discharged. The arm 41/42/42s is activated by a cylinder 43 that is directly connected to the tailgate cylinder 116. The butt-end of the cylinder 43 is connected to the butt-end of the cylinder 116 that raises the tailgate 12. The pressure required to raise the tailgate 12 is substantially higher than the pressure required to lower the stop arm 40, so this direct connection is adequate to cause the correct sequence of actions, for proper operation the stop arm 40 needs to be lowered before the bale 2 is discharged. Thus this direct connection provides a simple and reliable operation.

In the following operation, wherein the tailgate 12 is closed, the direct connection of the opposite end of the cylinder 43 to the tailgate cylinder 116 also provides the correct sequence. As the tailgate 12 is lowered, oil is directed to the rod-end of the tailgate cylinder 116 and at the same time oil is directed to the rod-end of the cylinder 43 that positions the stop-arm. This arrangement ensures that the stop arm 40 will be raised as the tailgate 12 closes.

Although FIGS. 37 and 38 illustrate specific combinations of components, these combinations can be varied. For instance a bale stop arm 40 could be added to the system illustrated in FIG. 37, if the bale stop arm mechanism 40 was mounted to the carriage frame 13*f* so that the stop arm 40 was in the correct position to stop the bale 2 regardless of when the carriage 13 was rotated to discharge a bale 2.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept as expressed by the attached claims.

We claim:

1. A round baler (10) with a front, a rear, a left side and a right side for making round bales (2) from forage material comprising:
   a. a baler frame (10*f*) with a carriage support structure (14), the carriage support structure (14) being attached to the baler frame (10*f*) and extending in a mostly horizontal orientation between the left side and the right side;
   b. ground engaging wheels (15) operatively rotatably attached to the baler frame (10*f*) about a mostly horizontal wheels axis;
   c. a rear gate (12) operatively pivotally attached to the baler frame (10*f*) about a horizontal gate pivot axis (12*a*) and having at least two positions including a closed position wherein the rear gate (12) defines a portion of a bale chamber and an open position wherein the bale chamber is open to allow a formed bale (2) to be discharged;
   d. a carriage frame (13*f*) having one end operatively pivotally attached about a mostly vertical support pivot axis (13*v*) to one end of the carriage support structure (14) rearwardly of the horizontal wheels axis of the ground engaging wheels (15) and to one side of the rear gate (12), the carriage frame (13*f*) having a first pivotal position and a second pivotal position, the second pivotal position being pivotally oriented in a substantially transverse relationship relative to the first pivotal position, wherein, in the first pivotal position thereof, the carriage frame is behind and between the sides of the baler and disposed substantially transversely to the baler forward direction, the carriage frame (13*f*) in the first pivotal position thereof being aligned to receive the formed bale (2) upon discharge from the rear gate;
   e. a carriage (13) operatively pivotally attached to the carriage frame (13*f*); and
   f. wherein the mostly vertical support pivot axis (13*v*) defines a fixed pivot location with respect to the baler frame (10*f*).

2. The baler of claim 1 wherein the carriage (13) is operatively pivotally attached to the carriage frame (13*f*) about a horizontal axis (13*h*, the carriage (13) and the carriage frame (13*f*) both being oriented in a same direction as the horizontal axis (13*h*).

3. The round baler of claim 1 wherein the carriage is operatively pivotally attached to the carriage frame along a mostly horizontal axis, the carriage defining a first side and a second side, wherein:
   i. when the carriage frame is in the first pivotal position, the second side of the carriage is a first distance above the ground; and
   ii. when the carriage frame is in the second pivotal position, the second side of the carriage is a second distance above the ground that is less than the first distance, a difference between the second distance and the first distance being sufficient to encourage a bale resting on the carriage to drop off of the second side of the carriage.

4. The baler of claim 3 wherein the carriage support structure further comprises a cam track and the carriage further comprises a positioning arm with a cam roller that is configured to engage the cam track wherein the cam and cam roller retain the carriage in its first position when the carriage frame is in its first position and retain the carriage in its second position when the carriage frame is in its second position.

5. The baler of claim 3 further comprising a fluid cylinder affixed to the carriage frame on one end and to the carriage on the other end, wherein the cylinder is configured to move the second side of the carriage between its first distance position and its second distance position above the ground.

6. The baler of claim 1 further comprising:
   a bale catching arm operatively attached to one of the baler frame and carriage frame on a first end thereof, the bale catching arm having a second end;
   wherein a bale when resting on the carriage in the second position thereof has a cylindrical axis, a top and a bottom, a side on one side of the cylindrical axis closest to the baler frame and a side on the other side of the cylindrical axis farthest from the baler frame; and
   at least a portion of the second end of the bale catching arm having at least a bale catching position disposed on the other side of the cylindrical axis farthest from the baler, thereby preventing the bale from rolling on the ground when the bale moves off of the carriage.

7. The baler of claim 1, wherein the carriage (13) defines a first bale entry side and a second bale exit side, the first bale entry side of the carriage (13) being configured to receive a bale upon discharge thereof via the rear gate, the second bale exit side of the carriage (13) being configured to be a chosen side of the carriage (13) from which a given bale is to drop off.

8. The baler of claim 1, the baler further comprising a stop mechanism (22*d*), the stop mechanism (22*d*) being operatively attached to the carriage frame (13*f*), the stop mechanism (22*d*) stopping movement of the carriage (13) at the second pivotal position thereof when the carriage frame (13) is moving from the first to the second pivotal position of the carriage frame (13*f*), whereby inertia of the bale moving from the first pivotal position of the carriage frame to the second pivotal position of the carriage frame will cause the bale to fall off of the second side of the carriage when the carriage is stopped at the second pivotal position of the carriage frame.

9. The baler of claim 1, wherein the carriage frame (13*f*) has only one end thereof that is mounted to the carriage support structure (14), the other end thereof being a free end to permit movement of the carriage frame between the first pivotal position and the second pivotal position.

10. A round baler (10) with a front, a rear, a left side and a right side for making round bales (2) from forage material comprising:
   a. a baler frame (10f);
   b. ground engaging wheels (15) operatively rotatably attached to the baler frame (10f) about a mostly horizontal wheels axis;
   c. a rear gate (12) operatively pivotally attached to the baler frame (10f) about a horizontal gate pivot axis (12a) and having at least two positions including a closed position wherein the rear gate (12) defines a portion of a bale chamber and an open position wherein the bale chamber is open to allow a formed bale (2) to be discharged;
   d. a carriage (13) operatively attached relative to the baler frame (10f), the carriage (13) being operatively pivotally attached about a mostly vertical support pivot axis (13v) located rearwardly of the horizontal wheels axis of the ground engaging wheels (15) and to one side of the rear gate (12), the carriage (13) having a first pivotal position and a second pivotal position, the carriage defining a first bale entry side and a second bale exit side, the first bale entry side of the carriage being configured, while at the first pivotal position of the carriage (13), to receive a given bale via the rear gate, the second bale exit side of the carriage being configured to be a chosen side of the carriage (13) from which the given bale is to drop off, the carriage (13) being further configured to be at least one of tipped and pivoted in a manner to encourage the given bale to drop off from the carriage via the second bale exit side; and
   f. wherein the mostly vertical support pivot axis (13v) defines a fixed pivot location with respect to the baler frame (10f).

11. The baler of claim 10, wherein the carriage (13) is configured such that when moved to the second pivotal position thereof, the given bale is encouraged to drop off the second bale exit side thereof.

12. The baler of claim 11, further comprising a carriage frame (13f) and a carriage support structure (14), the carriage support structure (14) being attached to the baler frame (10f) and oriented mostly horizontally between the left side and the right side, the carriage frame (13f) being operatively attached to and carrying the carriage (13), the carriage frame (13f) having one end operatively pivotally attached about a mostly vertical support pivot axis (13v) to one end of the carriage support structure (14) rearwardly of the horizontal wheels axis of the ground engaging wheels (15) and to one side of the rear gate (12), the carriage frame (13f) being movable between the first pivotal position and the second pivotal position, the carriage frame in the first pivotal position being behind and between the sides of the baler wherein, in the first pivotal position, the carriage frame being disposed generally perpendicular to the baler forward direction.

13. A round baler (10) with a front, a rear, a left side and a right side for making round bales (2) from forage material comprising:
   a. a baler frame (10f);
   b. ground engaging wheels (15) operatively rotatably attached to the baler frame (10f) about a mostly horizontal wheels axis;
   c. a rear gate (12) operatively pivotally attached to the baler frame (10f) about a horizontal gate pivot axis (12a) and having at least two positions including a closed position wherein the rear gate (12) defines a portion of a bale chamber and an open position wherein the bale chamber is open to allow a formed bale (2) to be discharged;
   d. a carriage frame (13f) having one end operatively pivotally attached about a mostly vertical support pivot axis (13v) relative to the baler frame (10f) and located rearwardly of the horizontal wheels axis of the ground engaging wheels (15) and to one side of the rear gate (12), the carriage frame (13f) having a first pivotal position and a second pivotal position, the second pivotal position being pivotally oriented generally perpendicular relative to the first pivotal position;
   e. a carriage (13) operatively pivotally attached to the carriage frame (13f) about a horizontal frame axis (13h), the carriage (13) and the carriage frame (13f) both being oriented in a same direction as the horizontal frame axis (13h);
   f. wherein the mostly vertical support pivot axis (13v) defines a fixed pivot location with respect to the baler frame (10f).

14. The baler of claim 13, wherein, in the first pivotal position thereof, the carriage frame is behind and between the sides of the baler and disposed generally perpendicular to the baler forward direction.

15. The baler of claim 13, wherein the carriage (13) defines a first bale entry side and a second bale exit side, the first bale entry side of the carriage (13) being configured to receive a bale upon discharge thereof via the rear gate, the second bale exit side of the carriage (13) being configured to be the side of the carriage (13) from which a given bale is to drop off.

16. The baler of claim 15, wherein the carriage (13) is further configured to be at least one of tipped and pivoted in a manner to encourage the given bale to drop off from the carriage (13) via the second bale exit side.

17. The baler of claim 13, further comprising a carriage support structure (14), the carriage support structure being associated with the baler frame (10f) and being oriented mostly horizontally between the left side and the right side, the carriage frame (13f) having only one end thereof that is mounted to the carriage support structure (14), the other end thereof being a free end to permit movement of the carriage frame between the first pivotal position and the second pivotal position.

18. A round baler (10) with a front, a rear, a left side and a right side for making round bales (2) from forage material comprising:
   a. a baler frame (10f) with a carriage support structure (14) associated therewith, the carriage support structure (14) extending mostly horizontally between the left side and the right side;
   b. ground engaging wheels (15) operatively rotatably attached to the baler frame (10f) about a mostly horizontal wheels axis;
   c. a rear gate (12) operatively pivotally attached to the baler frame (10f) about a horizontal gate pivot axis (12a) and having at least two positions including a closed position wherein the rear gate (12) defines a portion of a bale chamber and an open position wherein the bale chamber is open to allow a formed bale (2) to be discharged;
   d. a carriage frame (13f) having one end operatively pivotally attached about a mostly vertical support pivot axis (13v) to one end of the carriage support structure (14) rearwardly of the horizontal wheels axis of the ground engaging wheels (15) and to one side of the rear gate (12), the carriage frame (13f) having a longitudinal axis transversely disposed with respect to the mostly vertical support pivot axis (13v), the longitudinal axis generally extending in a lengthwise direction of the carriage frame (13f), the carriage frame (13f) having a first pivotal position behind and between the sides of the baler wherein in the first position thereof the longitudinal axis is disposed generally parallel to the mostly horizontal wheels axis and a second pivotal position pivoted, via the mostly vertical support pivot axis (13*v*), approximately ninety (90) degrees from the first pivotal position thereof;

e. a carriage (13) operatively attached to the carriage frame (13*f*); and f. wherein the mostly vertical support pivot axis (13*v*) defines a fixed pivot location with respect to the baler frame (10*f*).

19. The baler of claim 17 wherein the carriage (13) operatively pivotally attached to the carriage frame (13*f*).

20. The baler of claim 17 wherein the carriage (13) is operatively pivotally attached to the carriage frame (13*f*) about a horizontal axis (13*h*) which is disposed generally parallel to the longitudinal axis of the carriage frame (13*f*).

21. The round baler of claim 17 wherein the carriage is operatively pivotally attached to the carriage frame along a mostly horizontal axis, the carriage having:
   i. a first position wherein the second side of the carriage is a first distance above the ground; and
   ii. a second position wherein the second side of the carriage is a second distance that is less than the first distance for encouraging a bale resting on the carriage to drop off of the second side of the carriage.

22. The round baler of claim 1 wherein the substantially transverse relationship of the second pivotal position relative to the first pivotal position is more specifically a generally perpendicular relationship.

23. The round baler of claim 1 wherein the substantially transverse relationship of the carriage frame with respect to the forward direction is more specifically a generally perpendicular relationship.

\* \* \* \* \*